United States Patent [19]
Ohki

[11] Patent Number: 5,276,784
[45] Date of Patent: Jan. 4, 1994

[54] 2-D DISCRETE COSINE TRANSFORM CIRCUIT WITH REDUCED NUMBER OF MULTIPLIERS

[75] Inventor: Mitsuharu Ohki, Tokyo, Japan

[73] Assignee: Sony Corporation, Tokyo, Japan

[21] Appl. No.: 808,658

[22] Filed: Dec. 17, 1991

[30] Foreign Application Priority Data

Dec. 28, 1990 [JP] Japan .................. 2-417119

[51] Int. Cl.$^5$ ............................................. G06F 15/62
[52] U.S. Cl. .................................... 395/127; 395/129; 395/130; 395/133; 382/56; 382/44; 364/725
[58] Field of Search ....................................... 395/140–; 382/41–; 364/703, 709.09, 725

[56] References Cited

U.S. PATENT DOCUMENTS

| | | | |
|---|---|---|---|
| 4,449,194 | 5/1984 | Wilhelm | 364/725 |
| 4,481,605 | 11/1984 | Chase | 395/143 X |
| 4,791,598 | 12/1988 | Liou et al. | 364/725 |

OTHER PUBLICATIONS

Discrete Cosine Transform IEEE Transactions on Computers Jan. 1974 pp. 90–93.

*Primary Examiner*—Heather R. Herndon
*Assistant Examiner*—Almis Jankus
*Attorney, Agent, or Firm*—William S. Frommer; Alvin Sinderbrand

[57] ABSTRACT

An image data processing apparatus includes a $<v>$ calculating block 7 for calculating a vector $<v>$ from a vector $<x>$ which has 64 elements in a real space and which has been generated as a sequence of image data in 8 rows and 8 columns in the real space, a $<w>$ calculating block 8 for calculating a vector $<w>$ from the vector $<x>$ in the real space, and a $<c>$ calculating block 9 for adding and subtracting elements of the vector $<v>$ and elements of the vector $<w>$, thereby producing a vector $<c>$ which has 64 elements in a space of spatial frequencies. The elements of the vector $<c>$ in the space of spatial frequencies are arranged into data in 8 rows and 8 columns in the space of spatial frequencies.

8 Claims, 8 Drawing Sheets

2-D DISCRETE COSINE TRANSFORM CIRCUIT WITH REDUCED NUMBER OF MULTIPLIERS

BACKGROUND OF THE INVENTION

1. Field of the Invention

The present invention relates to an image data processing apparatus for processing image data for a two-dimensional discrete cosine transform (DCT) or inverse discrete cosine transform (IDCT).

2. Description of the Prior Art:

Compressing image data for transmission often employs the discrete cosine transform (hereinafter referred to as "DCT") of two-dimensional image data arrayed in 8 rows and 8 columns, and decoding compressed image data into original image data often employs the inverse discrete cosine transform (hereinafter referred to as "IDCT") of two-dimensional image data arrayed in 8 rows and 8 columns. If it is assumed that a matrix of $8 \times 8$ image data in a real space with elements $x_{i,j}$ is indicated by X, a matrix of $8 \times 8$ data in a space of spatial frequencies with elements $c_{i,j}$ is indicated by C, and a transform matrix of 8 rows and 8 columns for a DCT is indicated by N, then the following equations (1) are satisfied for DCT, IDCT:

$$\text{DCT: } C = (\tfrac{1}{4})NXN^t,$$

$$\text{IDCT: } X = (\tfrac{1}{4})N^t CN \qquad (1).$$

The matrices N, X, C are defined as follows:

$$N = \begin{bmatrix} r & r & r & r & r & r & r & r \\ a & b & c & d & -d & -c & -b & -a \\ \alpha & \beta & -\beta & -\alpha & -\alpha & -\beta & \beta & \alpha \\ b & -d & -a & -c & c & a & d & -b \\ r & -r & -r & r & r & -r & -r & r \\ c & -a & d & b & -b & -d & a & -c \\ \beta & -\alpha & \alpha & -\beta & -\beta & \alpha & -\alpha & \beta \\ d & -c & b & -a & a & -b & c & -d \end{bmatrix}, \qquad (2)$$

where $r = \dfrac{1}{\sqrt{2}}$ $$X = \begin{bmatrix} x0,0 & x0,1 & \ldots & \ldots & x0,7 \\ x1,0 & x1,1 & \ldots & \ldots & x1,7 \\ \cdot & \cdot & & & \cdot \\ \cdot & \cdot & & & \cdot \\ \cdot & \cdot & & & \cdot \\ x7,0 & x7,1 & \ldots & \ldots & x7,7 \end{bmatrix},$$

$$C = \begin{bmatrix} c0,0 & c0,1 & \ldots & \ldots & c0,7 \\ c1,0 & c1,1 & \ldots & \ldots & c1,7 \\ \cdot & \cdot & & & \cdot \\ \cdot & \cdot & & & \cdot \\ \cdot & \cdot & & & \cdot \\ c7,0 & c7,1 & \ldots & \ldots & c7,7 \end{bmatrix}$$

In the above equations (2), $a = \cos(\pi/16)$, $\alpha = \cos(2\pi/16)$, $b = \cos(3\pi/16)$, $c = \cos(5\pi/16)$, $\beta = \cos(6\pi/16)$, $d = \cos(7\pi/16)$, and the matrix $N^t$ is a matrix transposed from the matrix N. The DCT is a linear transform from the matrix X to the matrix C, and the IDCT is a linear transform from the matrix C to the matrix X.

One conventional two-dimensional DCT processing circuit with a serial input and a serial output, and one conventional two-dimensional IDCT processing circuit with a serial input and a serial output will be described below with reference to FIGS. 1 and 2, respectively, of the accompanying drawings. The multiplication by $\tfrac{1}{4}$ of coefficients contained in the definition of DCT and IDCT will not be described below as it can easily be carried out by shifting 2 bits.

FIG. 1 shows a conventional two-dimensional DCT processing circuit. The two-dimensional DCT processing circuit includes a first $8 \times 8$ matrix processing circuit 1 to which there are serially supplied the elements $x_{i,j}$ of a matrix X in a real space. The first $8 \times 8$ matrix processing circuit 1 then multiplies the matrix X by a matrix N, producing a matrix NX, and serially supplies the 64 elements of the matrix NX to a rearranging circuit 2. The rearranging circuit 2 rearranges the inputted 64 elements of the matrix NX in a predetermined order, and supplies the rearranged 64 elements to a second $8 \times 8$ matrix processing circuit 3. The second $8 \times 8$ matrix processing circuit 3 multiplies the supplied matrix NX by a matrix $N^t$, producing a matrix $(NX)N^t$, and serially outputs the 64 elements $c_{i,j}$ of the matrix $(NX)N^t$ to a following processing circuit (not shown).

FIG. 2 shows a conventional two-dimensional IDCT processing circuit. The two-dimensional IDCT processing circuit includes a third $8 \times 8$ matrix processing circuit 4 to which there are serially supplied the elements $c_{i,j}$ of a matrix C in a space of spatial frequencies. The third $8 \times 8$ matrix processing circuit 4 then multiplies the matrix C by a matrix $N^t$, producing a matrix $N^t C$, and serially supplies the 64 elements of the matrix $N^t C$ through a rearranging circuit 5 to a fourth $8 \times 8$ matrix processing circuit 6. The fourth $8 \times 8$ matrix processing circuit 6 multiplies the supplied matrix $N^t C$ by the matrix N, producing a matrix $(N^t C)N$, and serially outputs the 64 elements $x_{i,j}$ of the matrix $(N^t C)N$.

Generally, a matrix processing circuit for processing serially inputted $8 \times 8$ matrices and serially outputting the produced matrix requires 8 multipliers. Therefore, each of the conventional two-dimensional DCT and IDCT processing circuits requires 16 ($= 2 \times 8$) multipliers. According to a generalization of this requirement, a two-dimensional $N \times N$ matrix (N is an integer of 2 or more) DCT or IDCT processing circuit requires 2N multipliers. Since the circuit scale of a multiplier is considerably larger than the circuit scale of an adder or a subtractor and also since the overall circuit scale of a processing circuit composed of multipliers is determined substantially depending on the number of the multipliers used, the conventional DCT and IDCT processing circuits have been relatively large in overall circuit scale.

Calculations carried out by multipliers are subject to a round-off error or a truncation error because numbers that are handled are of a limited number of digits. The conventional DCT processing circuit tends to produce a large error due to accumulated round-off errors because a total of two multiplications are effected by the first and second processing circuits 1, 2. The same problem occurs with the conventional IDCT processing circuit.

Japanese Laid-Open Patent Publication No. 62-61159 discloses a technique for reducing the number of multipliers by way of matrix resolution in DCT and IDCT processing apparatus for processing matrices with 8 one-dimensional elements. However, no proposal has been made for reducing the number of multipliers in two-dimensional processing apparatus.

OBJECTS AND SUMMARY OF THE INVENTION

In view of the drawbacks of the conventional image data processing apparatus, it is an object of the present invention to provide an image data processing apparatus which allows two-dimensional DCT and IDCT calculations to be effected with a reduced number of multipliers.

According to the present invention, there is provided, as shown in FIG. 3 of the accompanying drawings, a first image data processing apparatus for performing a discrete cosine transform to determine data in N rows and N columns (N is an integer of 2 or greater) in a space of spatial frequencies from image data in N rows and N columns in a real space, the image data processing apparatus comprising a first vector calculating circuit for calculating a first vector from a vector which has $N^2$ elements in a real space and which has been generated as a sequence of the image data in N rows and N columns in the real space, a second vector calculating circuit for calculating a second vector from the vector in the real space, an adder-subtractor for adding and subtracting elements of the first vector and elements of the second vector, thereby producing a vector which has $N^2$ elements in a space of spatial frequencies, and means for arranging elements of the vector in the space of spatial frequencies into data in N rows and N columns in the space of spatial frequencies.

According to the present invention, there is also provided, as shown in FIG. 8 of the accompanying drawings, a second image data processing apparatus for performing an inverse discrete cosine transform to determine image data in N rows and N columns (N is an integer of 2 or greater) in a real space from data in N rows and N columns in a space of spatial frequencies, the image data processing apparatus comprising a first vector calculating circuit for adding and subtracting elements of a vector which has $N^2$ elements in a space of spatial frequencies and which has been generated as a sequence of the data in N rows and N columns in the space of spatial frequencies, thereby producing elements of a first vector and elements of a second vector, a second vector calculating circuit for calculating a third vector from the first vector, a third vector calculating circuit for calculating a fourth vector from the second vector, an adder for adding elements of the third vector and elements of the fourth vector, thereby producing a vector which has $N^2$ elements in a real space, and means for arranging elements of the vector in the real space into image data in N rows and N columns in the real space.

In the first image data processing apparatus, the multiplication of matrices in N rows and N columns for a discrete cosine transform (DCT) is replaced with the multiplication of a constant matrix in $N^2$ rows and $N^2$ columns and a vector having $N^2$ elements. Based on the characteristics of DCTs, the constant matrix can be represented by the sum (see the equation (7), for example, below) of a first product of a matrix having all elements that are either 0 or $\pm 1$ and a matrix in which the number of elements other than 0 and $\pm 1$ in each row is smaller than N, and a second product of a matrix having all elements that are either 0 or $\pm 1$ and a matrix in which the number of elements other than 0 and $\pm 1$ in each row is smaller than N. The multiplication of the matrix in which the number of elements other than 0 and $\pm 1$ in each row is smaller than N and a vector can be carried out by multipliers the number of which is smaller than N. Consequently, the first vector calculating circuit (7) and the second vector calculating circuit (8) may be composed of less than 2N multipliers in total. Furthermore, since the multiplication of a matrix having all elements are 0 or $\pm 1$ and a vector can be carried out by an adder-subtractor, the final result of DCT calculations can be determined as a vector representation by the adder-subtractor (9).

In the second image data processing apparatus, the multiplication of matrices in N rows and N columns for an inverse discrete cosine transform (IDCT) is replaced with the multiplication of a constant matrix in $N^2$ rows and $N^2$ columns and a vector having $N^2$ elements. Based on the characteristics of IDCTs, the constant matrix can be represented by the sum (see the equation (8), for example, below) of a first product of a matrix in which the number of elements other than 0 and $\pm 1$ in each row is smaller than N and a matrix having all elements that are either 0 or $\pm 1$, and a second product of a matrix in which the number of elements other than 0 and $\pm 1$ in each row is smaller than N and a matrix having all elements that are either 0 or $\pm 1$. Calculations for an IDCT are effected in a process that is an inverse of the process of calculations for a DCT. First, the elements of the vector $<c>$ in the space of spatial frequencies are added and subtracted by the first vector calculating circuit (39), thereby producing the elements of the first vector $<y>$ and the elements of the second vector $<z>$. Then, the third vector $<y'>$ and the fourth vector $<z'>$ are determined respectively by the second vector calculating circuit (40) and the third vector calculating circuit (41) which are composed of less than 2N multipliers altogether. Finally, the vector $<x>$ in the real space is determined by the adder (42).

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENTS

Figure 1:
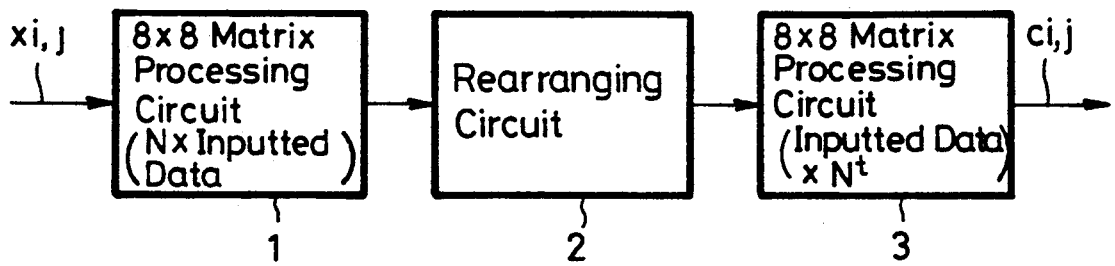
FIG. 1 is a block diagram of a conventional two-dimensional 8×8 DCT processing circuit.
Figure 2:
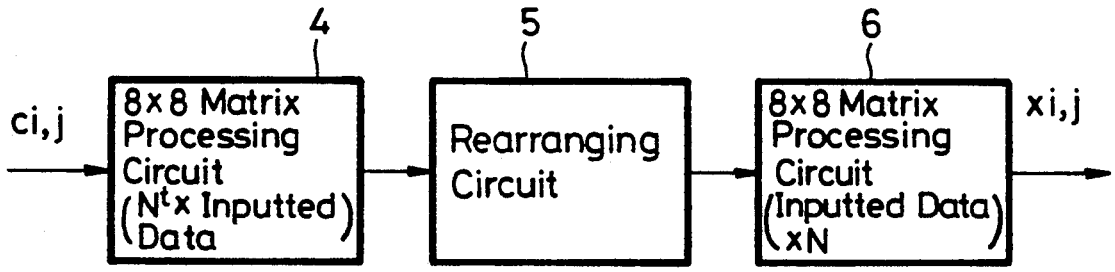
FIG. 2 is a block diagram of a conventional two-dimensional 8×8 IDCT processing circuit.

FIGS. 3 through 11 show a DCT processing circuit for processing two-dimensional matrixes arrayed in 8 rows and 8 columns and an IDCT processing circuit for processing two-dimensional matrices arrayed in 8 rows and 8 columns, according to the present invention. Heretofore, the DCT and IDCT are defined according to the equations (1) given above. According to the present invention, a matrix X of 8 rows and 8 columns of 64 elements $x_{i,j}$ in a real space, as defined according to the equations (2), is transformed into a vector $<x>$ having 64 elements $x_k$ ($k = 0, 1, \ldots, 63$). The elements $x_k$ of the vector $<x>$ and the elements $x_{i,j}$ of the matrix X correspond to each other according to an equation (3) given below. Specifically, $x_0 = x_{0,0}$, $x_1 = x_{7,7}$, $x_2 = x_{3,3}$, $\ldots$, $x_{63} = x_{3,2}$.

$$\begin{bmatrix} x0 & x56 & x43 & x22 & x19 & x46 & x61 & x5 \\ x32 & x8 & x31 & x50 & x55 & x26 & x13 & x37 \\ x48 & x24 & x11 & x38 & x35 & x14 & x29 & x53 \\ x16 & x40 & x63 & x2 & x7 & x58 & x45 & x21 \\ x20 & x44 & x59 & x6 & x3 & x62 & x41 & x17 \\ x52 & x28 & x15 & x34 & x39 & x10 & x25 & x49 \\ x36 & x12 & x27 & x54 & x51 & x30 & x9 & x30 \\ x4 & x60 & x47 & x18 & x23 & x42 & x57 & x1 \end{bmatrix} = \qquad (3)$$

$$\begin{bmatrix} x_{0,0} & x_{0,1} & \ldots & x_{0,7} \\ x_{1,0} & x_{1,1} & \ldots & x_{1,7} \\ x_{2,0} & x_{2,1} & \ldots & x_{2,7} \\ \cdot & \cdot & & \cdot \\ \cdot & \cdot & & \cdot \\ \cdot & \cdot & & \cdot \\ x_{7,0} & x_{7,1} & \ldots & x_{7,7} \end{bmatrix}$$

Likewise, a matrix C of 8 rows and 8 columns of 64 elements $c_{i,j}$ in a space of spatial frequencies, as defined according to the equations (2), is transformed into a vector $<c>$ having 64 elements $c_k$ ($k = 0, 1, \ldots, 63$). The elements $c_k$ of the vector $<c>$ and the elements $c_{i,j}$ of the matrix C correspond to each other according to an equation (4) given below. Specifically, $c_0 = c_{0,0}$, $c_1 = c_{4,4}$, $c_2 = c_{0,4}$, $\ldots$, $c_{63} = c_{6,1}$.

$$\begin{bmatrix} c0 & c48 & c4 & c50 & c2 & c52 & c6 & c54 \\ c32 & c16 & c40 & c20 & c39 & c22 & c47 & c18 \\ c8 & c56 & c12 & c58 & c10 & c60 & c14 & c62 \\ c34 & c24 & c42 & c28 & c37 & c30 & c45 & c26 \\ c3 & c55 & c7 & c53 & c1 & c51 & c5 & c49 \\ c36 & c27 & c44 & c31 & c35 & c29 & c43 & c25 \\ c11 & c63 & c15 & c61 & c9 & c59 & c13 & c57 \\ c38 & c19 & c46 & c23 & c33 & c21 & c41 & c17 \end{bmatrix} = \qquad (4)$$

$$\begin{bmatrix} c_{0,0} & c_{0,1} & \ldots & c_{0,7} \\ c_{1,0} & c_{1,1} & \ldots & c_{1,7} \\ c_{2,0} & c_{2,1} & \ldots & c_{2,7} \\ \cdot & \cdot & & \cdot \\ \cdot & \cdot & & \cdot \\ \cdot & \cdot & & \cdot \\ c_{7,0} & c_{7,1} & \ldots & c_{7,7} \end{bmatrix}$$

Thus, the vectors $<x>$, $<y>$ can be defined as follows:

$$<x> = \begin{bmatrix} x0 \\ x1 \\ x2 \\ \cdot \\ \cdot \\ \cdot \\ x63 \end{bmatrix}, \quad <c> = \begin{bmatrix} c0 \\ c1 \\ c2 \\ \cdot \\ \cdot \\ \cdot \\ c63 \end{bmatrix} \qquad (5)$$

The above definition indicates that the two-dimensional 8×8 DCT is regarded as a linear transform from the vector $<x>$ with the 64 elements in the real space into the vector $<c>$ with the 64 elements in the space of spatial frequencies, and the two-dimensional 8×8 IDCT as a linear transform from the latter vector $<c>$ into the former vector $<x>$. If a transformation matrix of 64 rows and 64 columns for the linear transform of the DCT is indicated by M and a transformation matrix of 64 rows and 64 columns for the linear transform of the IDCT is indicated by M', then the DCT and the IDCT are defined as follows:

$$\text{DCT: } <c> = M<x>,$$

$$\text{IDCT: } <x> = M'<c> \qquad (6)$$

When the transformation matrix M is represented by the sum of products of the matrix, the DCT is expressed as follows:

$$<c> = (\tfrac{1}{2})(PQ + RS)<x> \qquad (7)$$

where P, Q, R, and S are respectively constant matrices of 64 rows and 64 columns. Similarly, when the transformation matrix M' is represented by the sum of products of the matrix, the IDCT is expressed as follows:

$$<x> = (\tfrac{1}{2})(Q^t P^t + S^t R^t)<c> \qquad (8)$$

where $P^t$, $Q^t$, $R^t$, and $S^t$ are respectively transposed matrices of P, Q, R, and S.

The matrix P has 32 rows and 64 columns in the upper half whose elements are 0, 1, or −1, and 32 rows and 64 columns in the lower half whose elements are all 0, as indicated by the following equation (9):

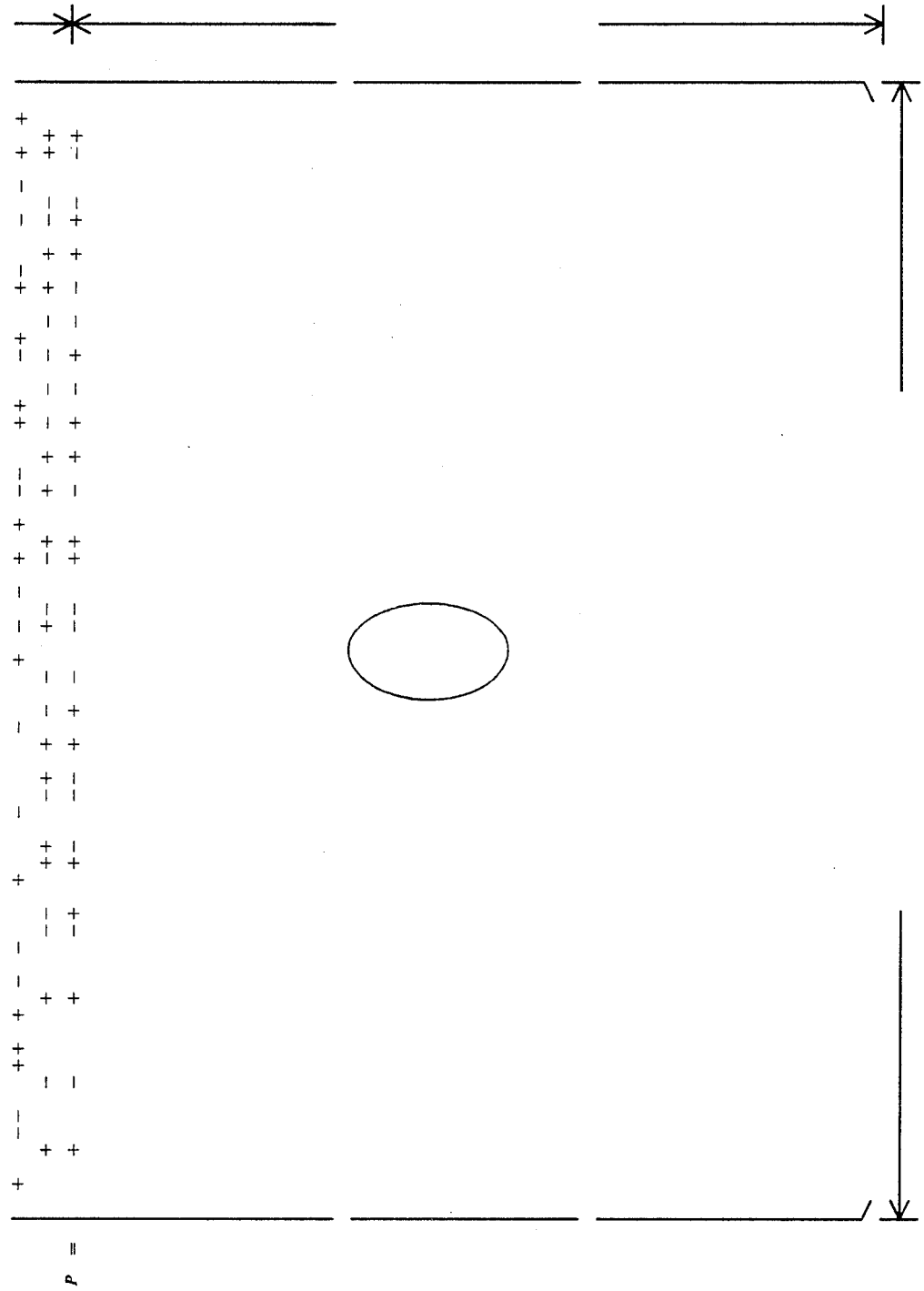

In the equation (9), the symbol + represents 1, the symbol − represents −1, and the blank space represents 0. The same definition applies to similar equations given below. The multiplication of the matrix P and a vector having 64 elements can therefore be carried out only by an adder-subtractor circuit.

The matrix Q can be expressed by the following equation (10) using the same constants r, $\alpha$, $\beta$ as used in the equations (2):

$$Q = \begin{bmatrix} Q1 & & & & 0 \\ & Q1 & & & \\ & & Q1 & & \\ & & & \ddots & \\ 0 & & & & Q1 \end{bmatrix}, \quad (10)$$

$$Q1 = \begin{bmatrix} 1 & 1 & 1 & 1 \\ r & r & r & r \\ \alpha & \alpha & -\alpha & -\alpha \\ \beta & \beta & -\beta & -\beta \end{bmatrix}$$

The matrix Q is made up of 64 rows and 64 columns, containing 16 smaller matrices Q1 each of 4 rows and 4 columns along a diagonal line inclined downwardly to the right, with only those smaller matrices Q1 having nonzero elements and the other elements being all 0. Since each of the smaller matrices Q1 contains only one element other than 0 or ±1 in each row (however, $\alpha$ and $-\alpha$, for example, are counted together as one element), the original matrix Q and the vector of 64 elements, which are serially inputted and outputted, can be multiplied by only one multiplier.

The matrix R has 32 rows and 64 columns in the upper half whose elements are all, and 32 rows and 64 columns in the lower half whose elements are 0, 1, or −1, as indicated by an equation (11) given below. The multiplication of the matrix R and a vector having 64 elements can therefore be carried out only by an adder-subtractor circuit.

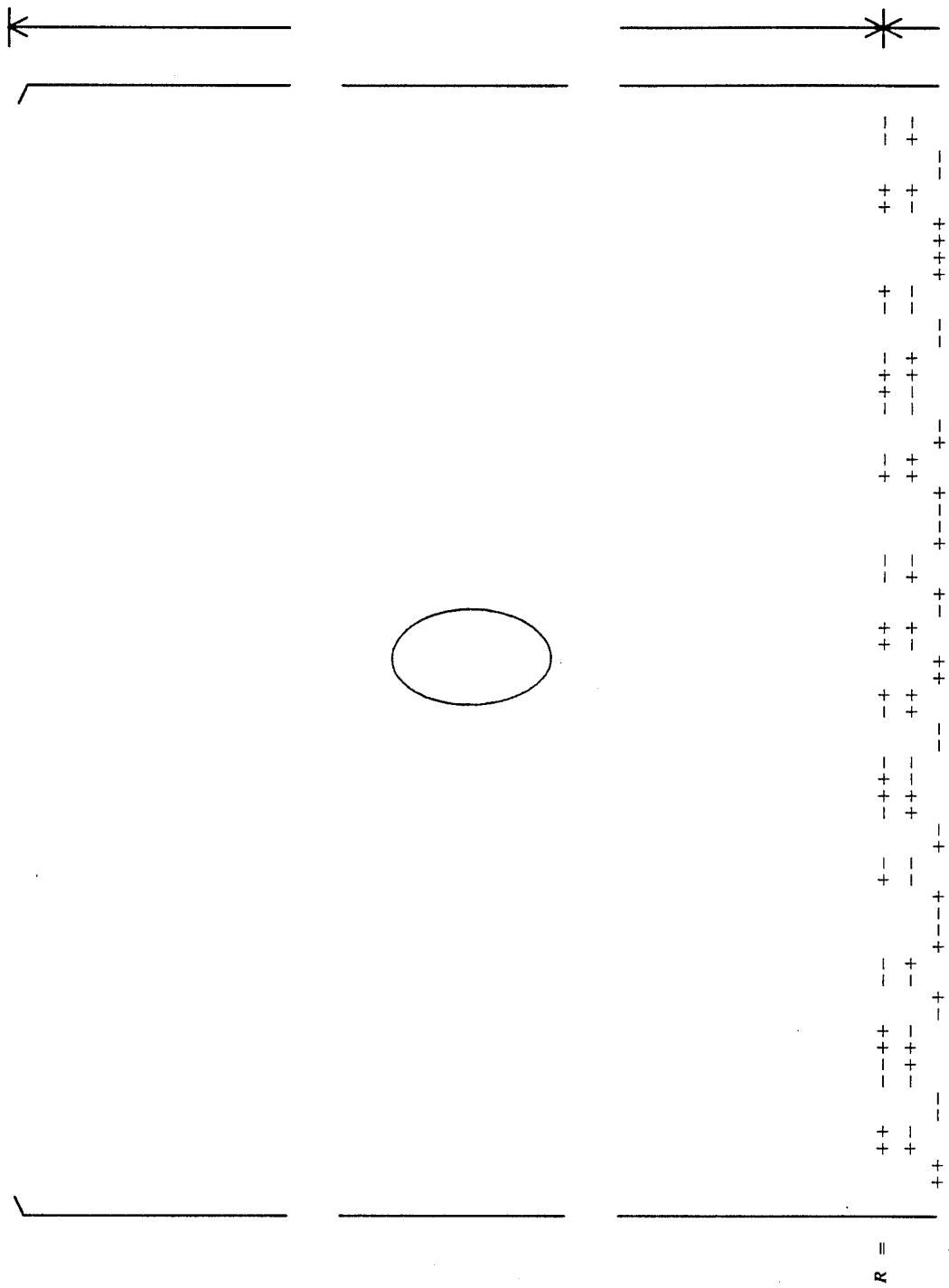

-continued

The matrix S can be expressed by the following equation (12) using the same constants a, b, c, and d as used in the equations (2):

$$S = \begin{bmatrix} S1 & & & & 0 \\ & S1 & & & \\ & & S1 & & \\ & & & \ddots & \\ 0 & & & & S1 \end{bmatrix}, \quad (12)$$

$$S1 = \begin{bmatrix} a & -a & d & -d \\ d & -d & -a & a \\ b & -b & -c & c \\ c & -c & b & -b \end{bmatrix}$$

The matrix S is made up of 64 rows and 64 columns, containing 16 smaller matrices Q1 each of 4 rows and 4 columns along a diagonal line inclined downwardly to the right, with only those smaller matrices S1 having nonzero elements and the other elements being all 0. Since each of the smaller matrices S1 contains only two elements other than 0 or ±1 in each row (however, a and −a, for example, are counted together as one element), the original matrix S and the vector of 64 elements, which are serially inputted and outputted, can be multiplied by only two multipliers.

Consequently, if a DCT is expressed according to the equation (7), then the DCT can be effected on serially inputted and outputted matrices by only three multipliers. Accordingly, the number of multipliers used is much smaller than the number of 16 multipliers used by the conventional DCT circuit. The equation (7) allows the DCT to be carried out in a single multiplication, no round-off errors or truncation errors are accumulated. Inasmuch as the matrices $Q^t$, $P^t$, $S^t$, $R^t$ used in the IDCT according to the equation (8) have the same characteristics as those of the matrices Q, P, S, R, respectively, the IDCT according to the equation (8) can also be carried out by only three multipliers, as can be understood from circuit arrangements described later on.

For the purpose of illustrating circuit arrangements that carry out the calculations according to the equations (7) and (8), the equation (7) is modified as follows:

$$\begin{aligned}<c> &= (1/8)(PQ + RS)<x> \\ &= (1/8)(P<v> + R<w>). \end{aligned} \quad (13)$$

The vectors $<v>$ and $<w>$ can be expressed as follows:

$$<x> = \begin{bmatrix} v0 \\ v1 \\ v2 \\ \cdot \\ \cdot \\ \cdot \\ v63 \end{bmatrix} = Q<x>, \quad <w> = \begin{bmatrix} w0 \\ w1 \\ w2 \\ \cdot \\ \cdot \\ \cdot \\ w63 \end{bmatrix} = S<x>. \quad (14)$$

Similarly, the equation (8) is modified into the following equation (15):

$$\begin{aligned}<x> &= (1/8)(Q^t P^t + S^t R^t)<c> \\ &= (1/8)(Q^t <y> + S^t <z>) \\ &= (1/8)(<y'> + <z'>). \end{aligned} \quad (15)$$

The vectors $<y>$ and $<z>$ in the equation (15) are expressed by the following equations (16), and the vectors $<y'>$ and $<z'>$ in the equation (15) are expressed by the following equations (17):

$$<y> = \begin{bmatrix} y0 \\ y1 \\ y2 \\ \cdot \\ \cdot \\ \cdot \\ y63 \end{bmatrix} = P^t <c>, \quad <z> = \begin{bmatrix} z0 \\ z1 \\ z2 \\ \cdot \\ \cdot \\ \cdot \\ z63 \end{bmatrix} = R^t <c>. \quad (16)$$

$$<y'> = \begin{bmatrix} y0' \\ y1' \\ y2' \\ \cdot \\ \cdot \\ \cdot \\ y63' \end{bmatrix} = Q^t <y>, \quad <z'> = \begin{bmatrix} z0' \\ z1' \\ z2' \\ \cdot \\ \cdot \\ \cdot \\ z63' \end{bmatrix} = S^t <z>. \quad (17)$$

With the above definition, the two-dimensional 8×8 DCT according to the equation (13) can be calculated in three steps described below. The multiplication of (⅛) can be performed by a shift of three bits, and hence will not be described below.

(Step D1) The elements of the vector $<x>$ are serially inputted to determine the vector $<v>$ according to the equations (14).

(Step D2) The vector $<w>$ is determined from the elements of the vector $<x>$ according to the equations (14).

(Step D3) The calculation of $P<v>+R<w>$ is effected based on the vectors $<v>$ and $<w>$, thus determining the vector $<c>$.

Similarly, the two-dimensional 8×8 IDCT according to the equation (15) can be calculated in the following three steps:

(Step I1) The elements of the vector $<c>$ are serially inputted to determine the vectors $<y>$ and $<z>$ according to the equations (16).

(Step 12) The vectors $<y'>$ and $<z'>$ are determined from the elements of the vectors $<y>$ and $<z>$ according to the equations (17).

(Step 13) The calculation of $<y'>+<z'>$ is effected based on the vectors $<y'>$ and $<z'>$, thus determining the vector $<x>$.

Figure 3:
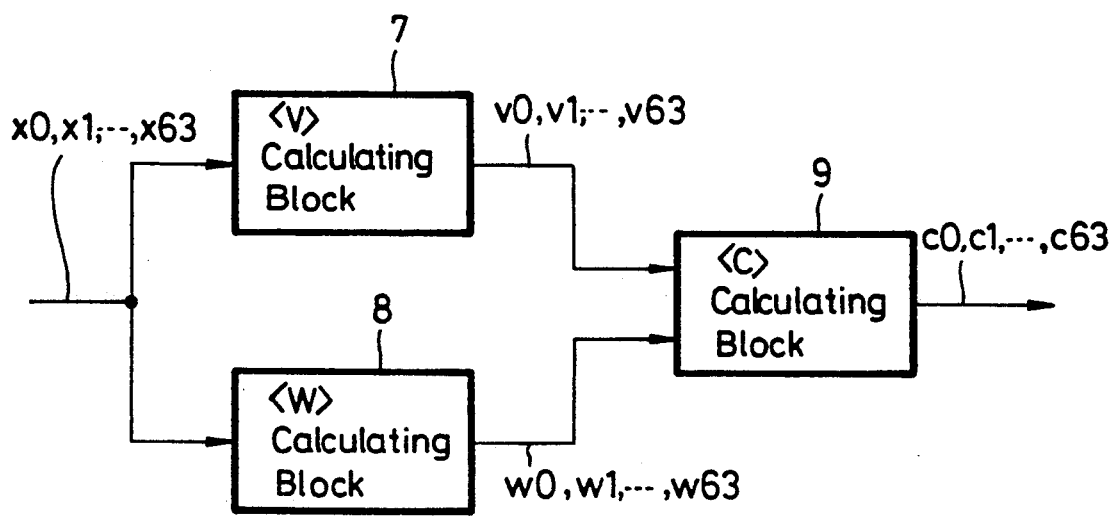
FIG. 3 is a block diagram of a two-dimensional 8×8 DCT processing circuit according to the present invention.

FIG. 3 shows a two-dimensional 8×8 DCT processing circuit according to the present invention. As shown in FIG. 3, the two-dimensional 8×8 DCT processing circuit comprises a $<v>$ calculating block 7 for calculating a vector $<v>$, a $<w>$ calculating block 8 for calculating a vector $<w>$, and a $<c>$ calculating block 9 for calculating a vector $<c>$. The $<v>$ and $<w>$ calculating blocks 7, 8 are supplied with the 64 elements xi (i=0, 1, ..., 63) of a vector $<x>$. If the 64 elements are shifted by one element in a period equal to one clock pulse, then when the elements xi are supplied to the $<v>$ and $<w>$ calculating blocks 7, 8, the $<v>$ calculating block 7 supplies the 64 elements vi of the vector $<v>$ serially to the $<c>$ calculating block 9 with a delay of four clock pulses, and the $<w>$ calculating block 8 supplies the 64 elements wi of the vector $<w>$ serially to the $<c>$ calculating block 9 with a delay of four clock pulse. The $<c>$ calculating block 9 then supplies the 64 elements ci of the vector $<c>$, which is produced according to the step D3 above, serially to a subsequent circuit in synchronism with 64 clock pulses.

Figure 4:
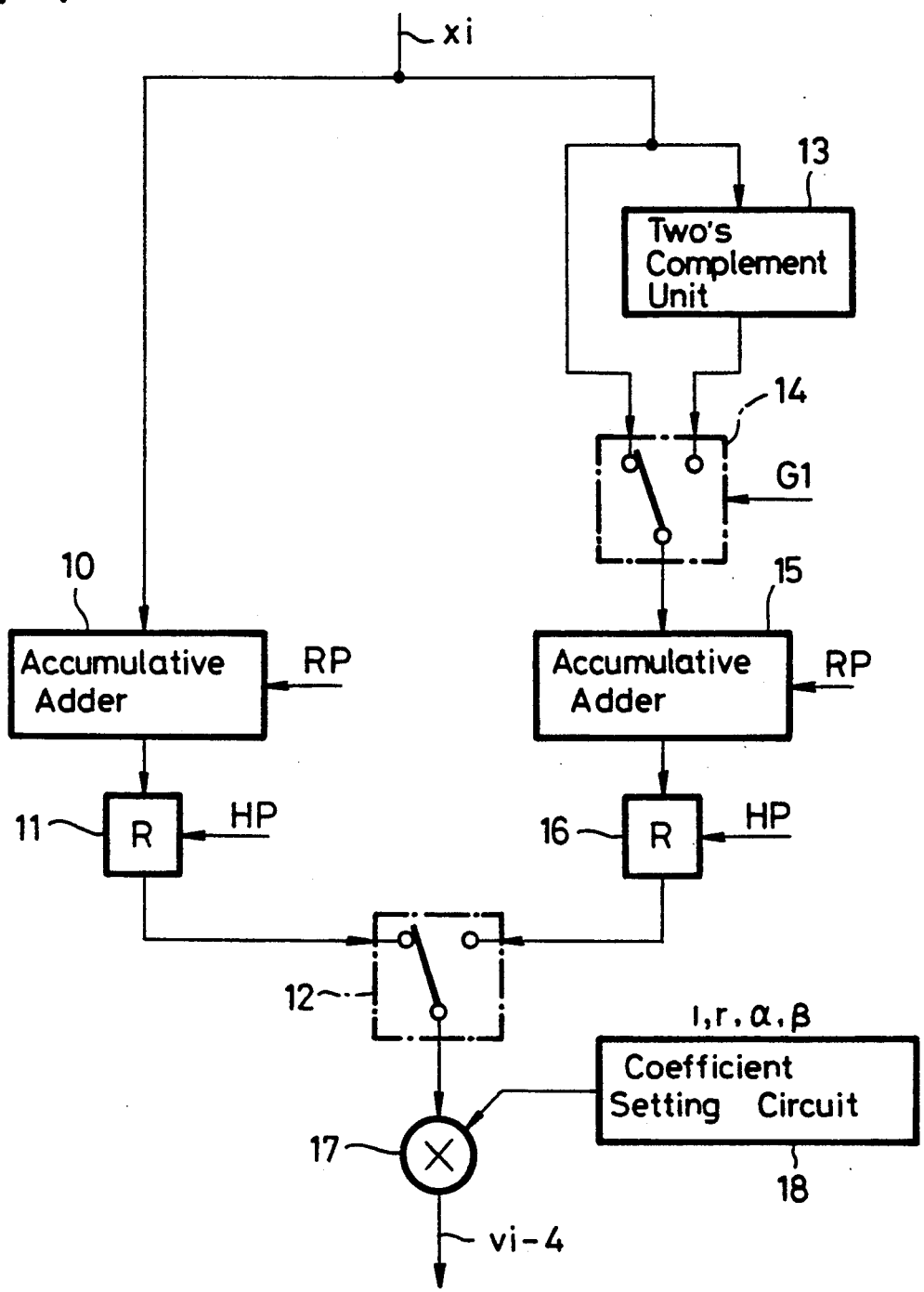
FIG. 4 is a block diagram of a $<v>$ calculating block in the DCT processing circuit shown in FIG. 3.

FIG. 4 shows the $<v>$ calculating block 7 in specific detail. In FIG. 4, the elements xi of the vector $<x>$ are supplied through an accumulative adder 10 and a register 11 with a hold function to one input terminal of a data selector 12. The elements xi of the vector $<x>$ are also supplied directly to an input terminal of a data selector 14 and through a two's complement unit 13 to the other input terminal of the data selector 14. The data selector 14 supplies output data through an accumulative adder 15 and a register 16 with a hold function to the other input terminal of the data selector 12. The two's complement unit 13 is used to multiply input data supplied hereto by −1. The data selector 12 supplies selected data to a multiplier 17. A coefficient setting circuit 18 periodically supplies a multiplier 17 with multiplying coefficients in the order of 1, r, α, β, 1, r, .... The multiplier 17 multiplies the inputted data from the data selector 12 by the coefficients supplied from the coefficient setting circuit 18, producing the vector (v), and serially outputs the 64 elements vi−4 ("−4" means that the outputted data are four clock pulses delayed with respect to the inputted data) of the vector (v).

Operation of the $<v>$ calculating block 7 shown in FIG. 4 will be described below.

The elements vi of the vector $<v>$ and the elements xi of the vector $<x>$ are related to each other as follows:

$$\begin{bmatrix} v0 \\ v1 \\ v2 \\ \vdots \\ v63 \end{bmatrix} = \begin{bmatrix} Q1 & & & 0 \\ & Q1 & & \\ & & Q1 & \\ & & & \ddots \\ 0 & & & Q1 \end{bmatrix} \begin{bmatrix} x0 \\ x1 \\ x2 \\ \vdots \\ x63 \end{bmatrix} \quad (18)$$

$$Q1 = \begin{bmatrix} 1 & 1 & 1 & 1 \\ r & r & r & r \\ \alpha & \alpha & -\alpha & -\alpha \\ \beta & \beta & -\beta & -\beta \end{bmatrix}.$$

The equation (18) shows that the elements $v4j \sim v4j+3$ (j=0, 1, ..., 15) of the vector $<v>$ can be expressed by the elements $x4j \sim x4j+3$ of the vector $<x>$ as follows:

$$\begin{bmatrix} v4j \\ v4j+1 \\ v4j+2 \\ v4j+3 \end{bmatrix} = \begin{bmatrix} 1 & 1 & 1 & 1 \\ r & r & r & r \\ \alpha & \alpha & -\alpha & -\alpha \\ \beta & \beta & -\beta & -\beta \end{bmatrix} \begin{bmatrix} x4j \\ x4j+1 \\ x4j+2 \\ x4j+3 \end{bmatrix} \quad (19)$$

$$= \underbrace{\begin{bmatrix} 1 & 0 & 0 & 0 \\ 0 & r & 0 & 0 \\ 0 & 0 & \alpha & 0 \\ 0 & 0 & 0 & \beta \end{bmatrix}}_{Q2} \underbrace{\begin{bmatrix} 1 & 0 \\ 1 & 0 \\ 0 & 1 \\ 0 & 1 \end{bmatrix}}_{Q3} \underbrace{\begin{bmatrix} 1 & 1 & 1 & 1 \\ 1 & 1 & -1 & -1 \end{bmatrix}}_{Q4} \begin{bmatrix} x4j \\ x4j+1 \\ x4j+2 \\ x4j+3 \end{bmatrix}.$$

Therefore, the vector $<v>$ can be determined by multiplying the inputted vector $<x>$ successively by the 2×4 matrix Q4, the 4×2 matrix Q3, and the 4×4 matrix Q2 contained in the equation (19). As the four elements of the outputted vector can be determined from the data, corresponding to four clock pulses, of the inputted vector, the elements of the outputted vector are delayed four clock pulses with respect to the elements of the inputted vector. The equation (19) can be expressed according to ordinary equations as follows:

$v4j = 1 \times (x4j + x4j+1 + x4j+2 + x4j+3)$ $v4j+1 = r \times (x4j + x4j+1 + x4j+2 + x4j+3)$ $v4j+2 = \alpha \times (x4j + x4j+1 - x4j+2 - x4j+3)$ $v4j+3 = \beta \times (x4j + x4j+1 - x4j+2 - x4j+3).$ Specifically, in FIG. 4, the added values in the accumulative adders 10, 15 are reset to 0 by a reset pulse RP that is turned on initially in the period of four clock pulses. Thereafter, a switching signal G1 causes the data selector 14 to select the elements xi in the period of first two clock pulses, and to select the data outputted from the two's complement unit 13 in the period of next two clock pulses. In response to a hold pulse HP that is turned on finally in the period of four clock pulses, the registers 11, 16 hold the respective data inputted from the accumulative adders 10, 15. The reset pulse RP is also turned on in synchronism with the hold pulse HP, resetting the counts in the accumulative adders 10, 15. During the period of these four clock pulses, the calculations relative to the matrices Q4, Q3 according to the equation (19) are carried out in those circuits which precede the registers 11, 16, and the registers 11, 16 hold the data $(x4j+x4j+1+x4j+2+x4j+3)$ and the data $(x4j+x4j+1-x4j+2-x4j+3)$, respectively.

Subsequently, the data selector 12 selects the data outputted from the register 11 in the first two of next four clock pulses, and selects the data outputted from the register 16 in the last two of the four clock pulses. The registers 11, 16 output the data held thereby at all times. The multiplier 17 and the coefficient setting circuit 18 now perform the calculation relative to the matrix Q2 according to the equation (19). Concurrent with the calculation relative to the matrix Q2, the circuits preceding the registers 11, 16 effect the calculations relative to the matrices Q4, Q3 according to the equation (19) on the next four elements xi. In this manner, the $<v>$ calculating block 7 serially outputs the 64 elements of the vector $<v>$ with a delay of four clock pulses with respect to the inputted data.

Figure 5:
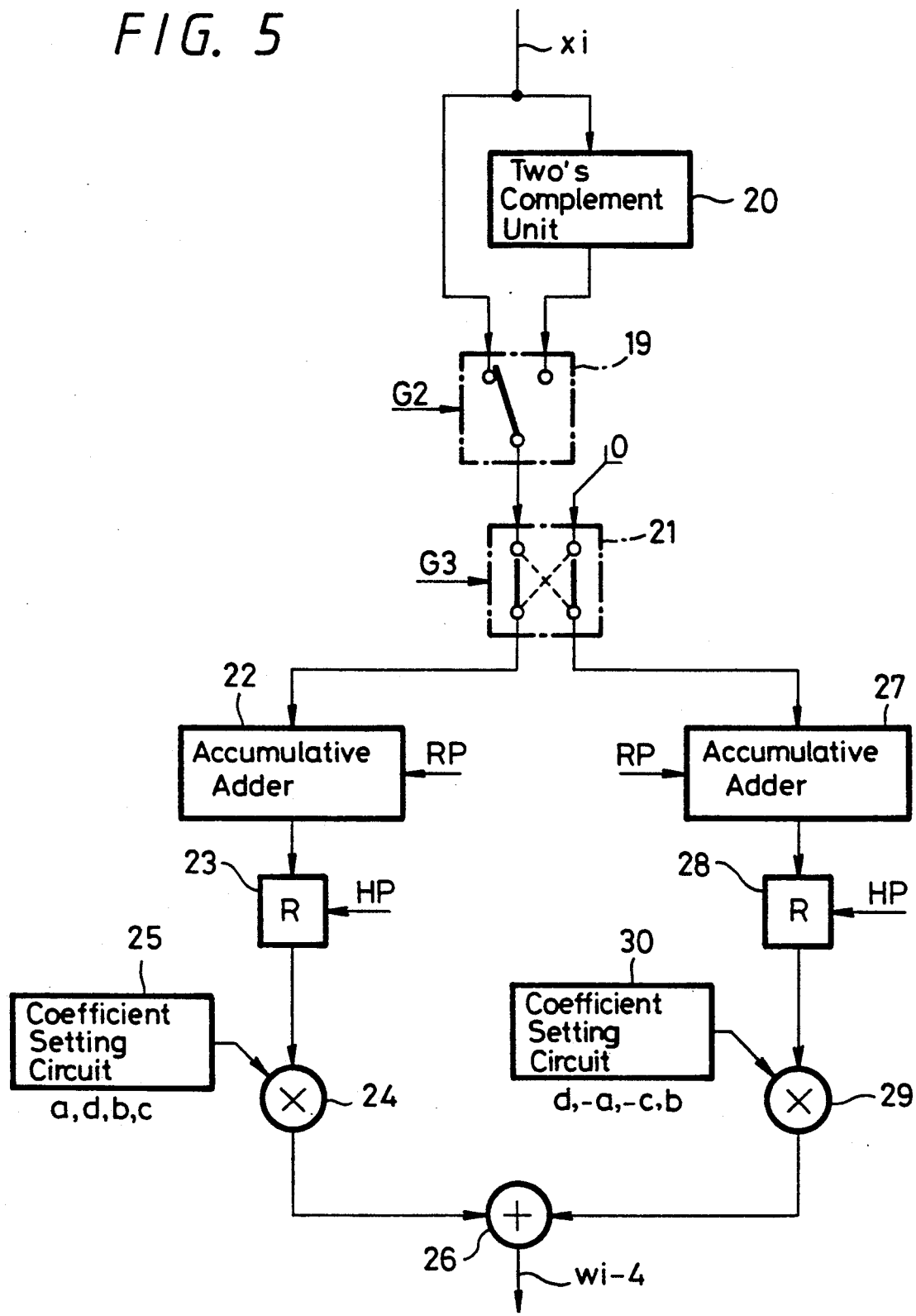
FIG. 5 is a block diagram of a $<w>$ calculating block in the DCT processing circuit shown in FIG. 3.

FIG. 5 shows the $<w>$ calculating block 8 in specific detail. In FIG. 5, the elements xi of the vector $<x>$ are supplied directly to one input terminal of a two-input data selector 19 and also through a two's complement unit 20 to the other input terminal of the data selector 21. The data selector 19 supplies output data to one input terminal of a two-input, two-output data selector 21, whose other input terminal is supplied with data having a value of 0. The data selector 21 outputs input data parallel to each other or in crossing relation, depending on the level of a control signal G3 applied thereto. One output data from the data selector 21 is supplied through an accumulative adder 22 and a register 23 with a hold function to a multiplier 24. A coefficient setting circuit 25 periodically supplies the multiplier 24 with coefficients a, d, b, c. The multiplier 24 multiplies the inputted data from the register 23 by the coefficients supplied from the coefficient setting circuit 25, and supplies resultant data to one input terminal of an adder 26.

The other output data from the data selector 21 is supplied through an accumulative adder 27 and a register 28 with a hold function to a multiplier 29. A coefficient setting circuit 30 periodically supplies the multiplier 29 with coefficients d, −a, −c, b. The multiplier 29 multiplies the inputted data from the register 28 by the coefficients supplied from the coefficient setting circuit 30, and supplies resultant data to the other input terminal of the adder 26. The adder 26 serially outputs the 64 elements wi-4 of the vector (w). As with the vector $<v>$, the elements of the vector $<w>$ are delayed four clock pulses with respect to those of the vector $<x>$.

Operation of the $<w>$ calculating block 8 shown in FIG. 5 will be described below.

The elements wi of the vector $<w>$ and the elements xi of the vector $<x>$ are related to each other as follows:

$$\begin{bmatrix} w0 \\ w1 \\ w2 \\ \cdot \\ \cdot \\ \cdot \\ w63 \end{bmatrix} = \begin{bmatrix} S1 & & & 0 \\ & S1 & & \\ & & S1 & \\ & & & \cdot \\ & & & & \cdot \\ 0 & & & & S1 \end{bmatrix} \begin{bmatrix} x0 \\ x1 \\ x2 \\ \cdot \\ \cdot \\ \cdot \\ x63 \end{bmatrix} \quad (20)$$

$$S1 = \begin{bmatrix} a & -a & d & -d \\ d & -d & -a & a \\ b & -b & -c & c \\ c & -c & b & -b \end{bmatrix}.$$

The equation (20) shows that the elements $w4j \sim w4j+3$ (j=0, 1, ..., 15) of the vector $<w>$ can be expressed by the elements $x4j \sim x4j+3$ of the vector $<x>$ as follows:

$$\begin{bmatrix} w4j \\ w4j+1 \\ w4j+2 \\ w4j+3 \end{bmatrix} = \begin{bmatrix} a & -a & d & -d \\ d & -d & -a & a \\ b & -b & -c & -c \\ c & -c & b & -b \end{bmatrix} \begin{bmatrix} x4j \\ x4j+1 \\ x4j+2 \\ x4j+3 \end{bmatrix} \quad (21)$$

$$= \underbrace{\begin{bmatrix} a & d \\ d & -a \\ b & -c \\ c & b \end{bmatrix}}_{S2} \underbrace{\begin{bmatrix} 1 & -1 & 0 & 0 \\ 1 & 0 & 1 & -1 \end{bmatrix}}_{S3} \begin{bmatrix} x4j \\ x4j+1 \\ x4j+2 \\ x4j+3 \end{bmatrix}.$$

Therefore, the vector $<w>$ can be determined by multiplying the inputted vector $<x>$ successively by the $2 \times 4$ matrix S3 and the $4 \times 2$ matrix S2 contained in the equation (21). As the four elements of the outputted vector can be determined from the data, corresponding to four clock pulses, of the inputted vector, the elements of the outputted vector are delayed four clock pulses with respect to the elements of the inputted vector. The equation (21) can be expressed according to ordinary equations as follows:

$w4j = a(x4j - x4j+1) + d(x4j+2 - x4j+3)$ $w4j+1 = d(x4j - x4j+1) - a(x4j+2 - x4j+3)$ $w4j+2 = b(x4j - x4j+1) - c(x4j+2 - x4j+3)$ $w4j+3 = c(x4j - x4j+1) + b(x4j+2 - x4j+3)$.

Specifically, in FIG. 5, the added values in the accumulative adders 22, 27 are reset to 0 by a reset pulse RP that is turned on initially in the period of four clock pulses. Thereafter, a switching signal G2 causes the data selector 19 to select elements xi and two's complemented elements xi alternately, and a switching signal G3 causes data selector 21 to output its inputted data in parallel during the first two clock pulses, and in crossing relation during latter two clock pulses. In response to a hold pulse HP that is turned on finally in the period of four clock pulses, the registers 23, 28 hold the respective data inputted from the accumulative adders 22, 27. The reset pulse RP is also turned on in synchronism with the hold pulse HP, resetting the counts in the accumulative adders 22, 27. During the period of these four clock pulses, the calculation relative to the matrix S3 according to the equation (21) is carried out in those circuits which precede the registers 23, 28, and the registers 23, 28 hold the data (x4j−x4j+1) and the data (x4j+2−x4j+3), respectively.

Subsequently, the matrix S2 according to the equation (21) is calculated by the multipliers 24, 29 and the adder 26 in the period of next four clock pulses. Concurrent with the calculation relative to the matrix S2, the circuits preceding the registers 23, 28 effect the calculation relative to the matrix S3 according to the equation (21) on the next four elements xi. In this manner, the $<w>$ calculating block 8 serially outputs the 64 elements of the vector $<w>$ with a delay of four clock pulses with respect to the inputted data.

Figure 6:
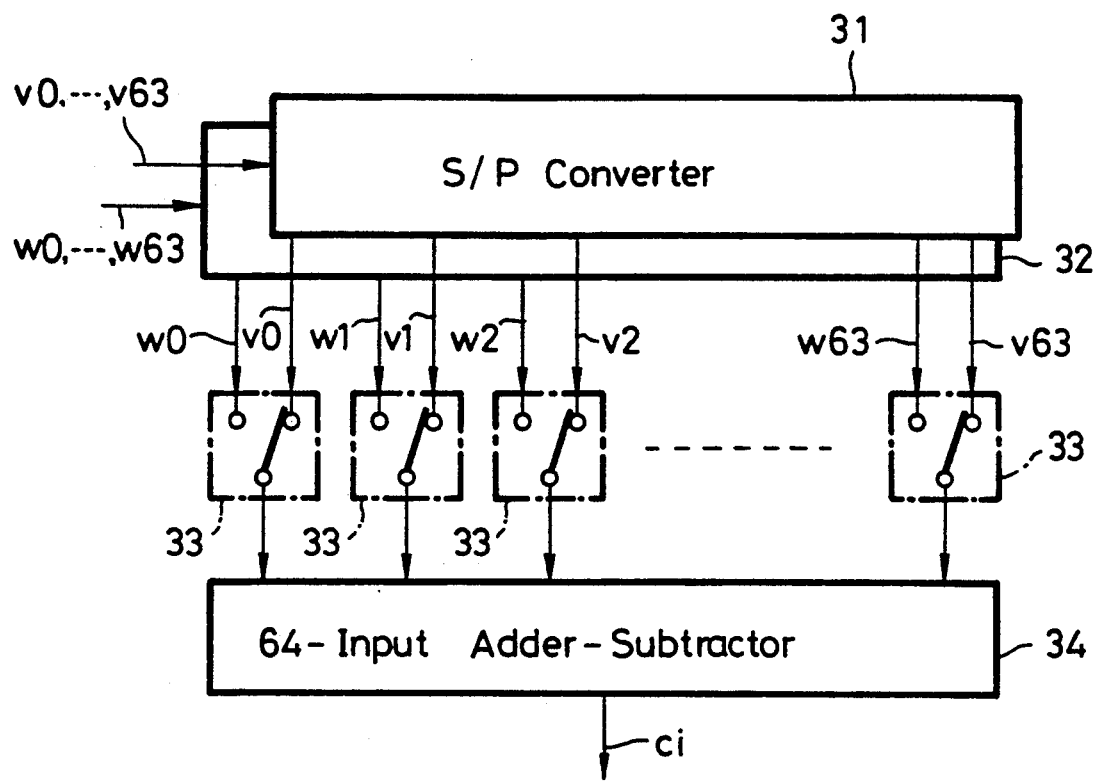
FIG. 6 is a block diagram of a $<c>$ calculating block in the DCT processing circuit shown in FIG. 3.

FIG. 6 shows the $<c>$ calculating block 9 in specific detail. The $<c>$ calculating block 9 includes one-input, 64-output serial-to-parallel (S/P) converters 31, 32 whose input terminals are supplied respectively with the 64 elements vi of the vector $<v>$ and the 64 elements wi of the vector $<wi>$. The S/P converter 31 converts the 64 elements vi that are inputted in the period of 64 clock pulses into parallel data v0~v63, and holds the parallel data in its output unit for next 64 clock pulses. Similarly, the S/P converter 32 holds parallel data w0~w63 in its output unit for the period of 64 clock pulses. 64 two-input, one-output data selectors 33 have input terminals supplied with the respective parallel data v0, v1, ..., v63 from the S/P converter 31, and other input terminals supplied with the respective parallel data w0, w1, ..., w63 from the S/P converter 32. A 64-input, one-output adder-subtractor 34 from the 64 data selectors 33, respectively. The output terminal of the adder-subtractor 34 serially outputs the 64 elements ci of a vector $<c>$ in a space of spatial frequencies.

Figure 7:
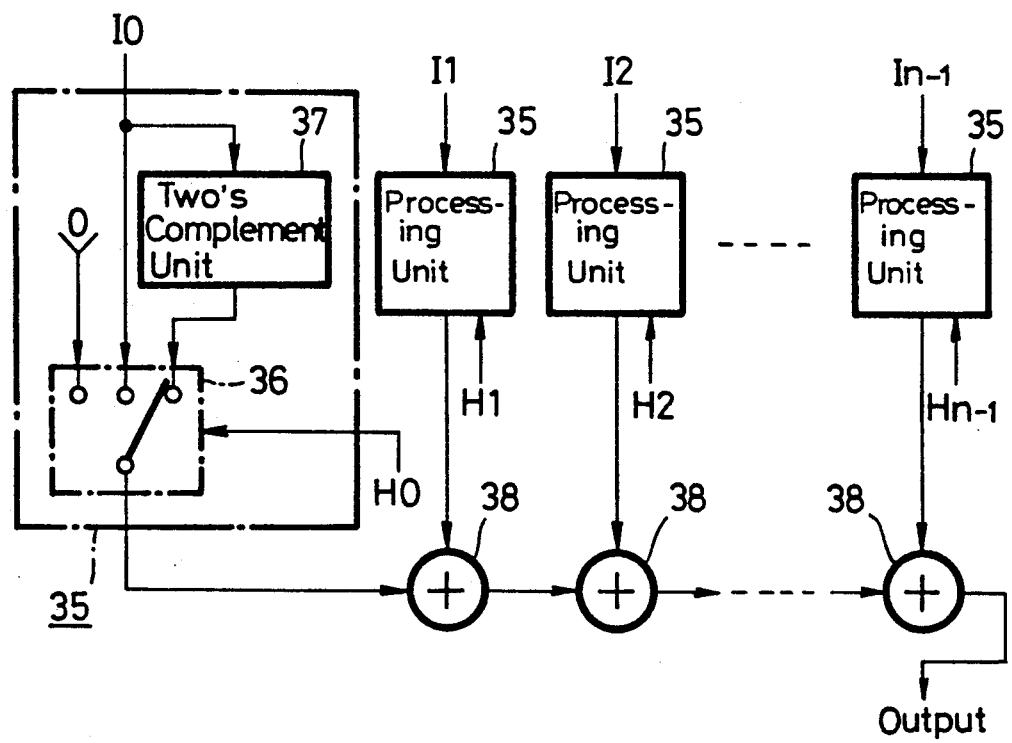
FIG. 7 is a block diagram of an n-input adder-subtractor.

FIG. 7 shows an n-input, one-output adder-subtractor in detail. In the case where n=64, the illustrated n-input, one-output adder-subtractor corresponds to the adder-subtractor 34 shown in FIG. 6. The n-input, one output adder-subtractor has n identical processing units 35 connected respectively to its n input terminals, and input data I0, I1, ..., In−1 are supplied respectively to the processing units 35. For example, the leftmost processing unit 35 has a three-input, one-output data selector 36. The input data I0 is supplied directly to a first input terminal of the data selector 36 and also through a two's complement unit 37 to a second input terminal of the data selector 36. The data selector 36 has a third input terminal supplied with data whose value is 0. In response to an externally supplied control signal H0, the data selector 36 selects one of the supplied inputted data at a time. The leftmost processing unit 35 thus outputs I0, −I0, or 0. Likewise, the other processing units 35 output Ii, −Ii, or 0 depending on a control signal Hi (i=1, 2, ..., n−1).

The data outputted from the n processing units 35 are then accumulatively added by (n−1) adders 38, and the resultant sum data is final output data from the n-input adder-subtractor. Therefore, the n-input adder-subtractor, which is supplied with the inputted data I0~In−1, outputs:

$$q_0 I_0 + q_1 I_1 + \ldots + q_{n-1} I_{n-1},$$

with qi being of a value of either 0, 1, or −1.

The $<c>$ calculating block 9 shown in FIG. 6 operates as follows: The $<c>$ calculating block 9 shown in FIG. 6 determines the vector $<c>$ according to the following equation:

$$<c> = P<v> + R<w> \tag{22}$$

From the equations (9) and (11), the equation (22 may be expressed as follows:

$$\begin{bmatrix} c0 \\ c1 \\ c2 \\ \cdot \\ \cdot \\ \cdot \\ c63 \end{bmatrix} = \begin{bmatrix} P1 \\ 0 \end{bmatrix} \begin{bmatrix} v0 \\ v1 \\ v2 \\ \cdot \\ \cdot \\ \cdot \\ v63 \end{bmatrix} + \begin{bmatrix} 0 \\ R1 \end{bmatrix} \begin{bmatrix} w0 \\ w1 \\ w2 \\ \cdot \\ \cdot \\ \cdot \\ w63 \end{bmatrix} \tag{23}$$

In the equation (23), the matrix P1 is composed of 32 rows and 64 columns whose elements are 0 or ±0 only, and the matrix R1 is also composed of 32 rows and 64 columns whose elements are 0 or ±0 only. Thus, the equation (23) can be divided into the following two equations:

$$\begin{bmatrix} c0 \\ c1 \\ c2 \\ \cdot \\ \cdot \\ \cdot \\ c31 \end{bmatrix} = \begin{bmatrix} q0,0 & \ldots & \ldots & q0,63 \\ q1,0 & \ldots & \ldots & q1,63 \\ \cdot & & & \cdot \\ \cdot & & & \cdot \\ \cdot & & & \cdot \\ q31,0 & \ldots & \ldots & q31,63 \end{bmatrix} \begin{bmatrix} v0 \\ v1 \\ v2 \\ \cdot \\ \cdot \\ \cdot \\ v63 \end{bmatrix}, \tag{24}$$

$$\begin{bmatrix} c32 \\ c33 \\ c34 \\ \cdot \\ \cdot \\ \cdot \\ c63 \end{bmatrix} = \begin{bmatrix} q32,0 & \ldots & \ldots & q32,63 \\ q33,0 & \ldots & \ldots & q33,63 \\ \cdot & & & \cdot \\ \cdot & & & \cdot \\ \cdot & & & \cdot \\ q63,0 & \ldots & \ldots & q63,63 \end{bmatrix} \begin{bmatrix} w0 \\ w1 \\ w2 \\ \cdot \\ \cdot \\ \cdot \\ w63 \end{bmatrix}.$$

In the equations (24), qi,j (i=0, 1, ..., 63, j=0, 1, ..., 63) has a value of 0, 1, or −1, and q0,j~q31,j are determined based on the matrix P1, and q32,j~q63,j are determined based on the matrix R1. It can be seen from the equations (24) that the former 32 elements, c0~c31, of the 64 elements of the vector $<c>$ can all be determined simply by adding and subtracting the 64 elements of the vector $<c>$, and the latter 32 elements, c32~c63 can all be determined simply by adding and subtracting the 64 elements of the vector $<w>$.

The 64 data selectors 33 shown in FIG. 6 select the elements vi with the first 32 clock pulses of 64 clock pulses, and accordingly the 64-input adder-subtractor 34 successively calculates the first 32 elements of the vector $<c>$ according to the first one of the equations (24). The 64 data selectors 33 then select the elements wi with the latter 32 clock pulses of 64 clock pulses, and accordingly the 64-input adder-subtractor 34 successively calculates the last 32 elements of the vector $<c>$ according to the second one of the equations (24).

The circuits shown in FIGS. 4 through 6 make it easy to process the serially inputted vector $<x>$ in the real space for DCT and to serially output the vector $<c>$ in the space of spatial frequencies. The total number of multipliers employed in the circuits shown in FIGS. 4 through 6 is 3, resulting in a substantial reduction in the number of multipliers used as compared with the 16 multipliers that have heretofore been used.

A two-dimensional 8×8 IDCT processing circuit according to the present invention will be described below. The IDCT processing circuit is supplied with the serially inputted 64 elements of a vector $<c>$ in a space of spatial frequencies, and serially outputs the 64 elements of a vector $<x>$ in a real space. From the equations (16) and (17) above, the vector $<x>$ can be expressed as follows:

$$<x> = (1/8)(Q^tP^t + S^tR^t)<c> \qquad (25)$$
$$= (1/8)(Q^t<y> + S^t<z>)$$
$$= (1/8)(<y'> + <z'>).$$

In the IDCT processing circuit, therefore, two vectors $<y>$ and $<z>$ are first determined from the vector $<c>$, then vectors $<y'>$ and $<z'>$ are determined respectively from the vectors $<y>$ and $<z>$, and finally the elements of the determined vectors are added, producing the vector $<x>$. The multiplication of the vector $<x>$ by $\frac{1}{8}$ will not be described here.

Figure 8:
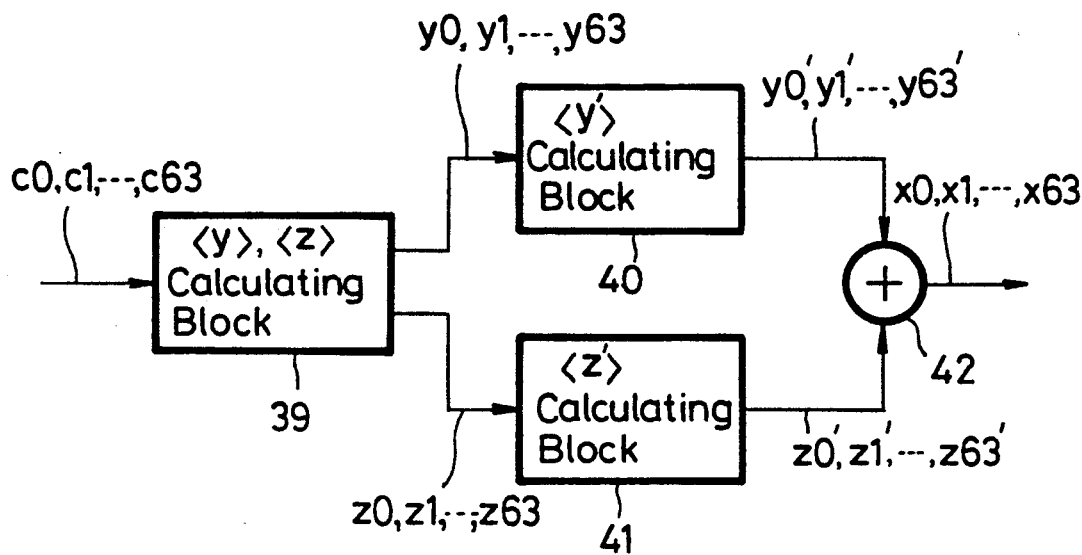
FIG. 8 is a block diagram of a two-dimensional 8×8 IDCT processing circuit according to the present invention.

FIG. 8 shows such a two-dimensional 8×8 IDCT processing circuit. In FIG. 8, the two-dimensional 8×8 IDCT processing circuit comprises a $<y>$, $<z>$ calculating block 39 for calculating vectors $<y>$, $<z>$. The $<y>$, $<z>$ calculating block 39 is serially supplied with the elements c0~c63 of the vector $<c>$. The $<y>$, $<z>$ calculating block 39 calculates the elements of two vectors $<y>$ and $<z>$ from the elements of the vector $<c>$, and serially supplies the 64 elements y0~y63 of the vector $<y>$ to a $<y'>$ calculating block 40 and also serially supplies the 64 elements z0~z63 of the vector $<z>$ to a $<z'>$ calculating block 41. Then, the $<y'>$ calculating block 40 serially supplies the 64 elements y0'~y63' of a vector $<y'>$ to one input terminal of an adder 42, and the $<z'>$ calculating block 41 serially supplies the 64 elements z0'~z63' of a vector $<z'>$ to the other input terminal of the adder 42. The adder 42 serially outputs the 64 elements x0~x63 of the vector $<x>$.

Figure 9:
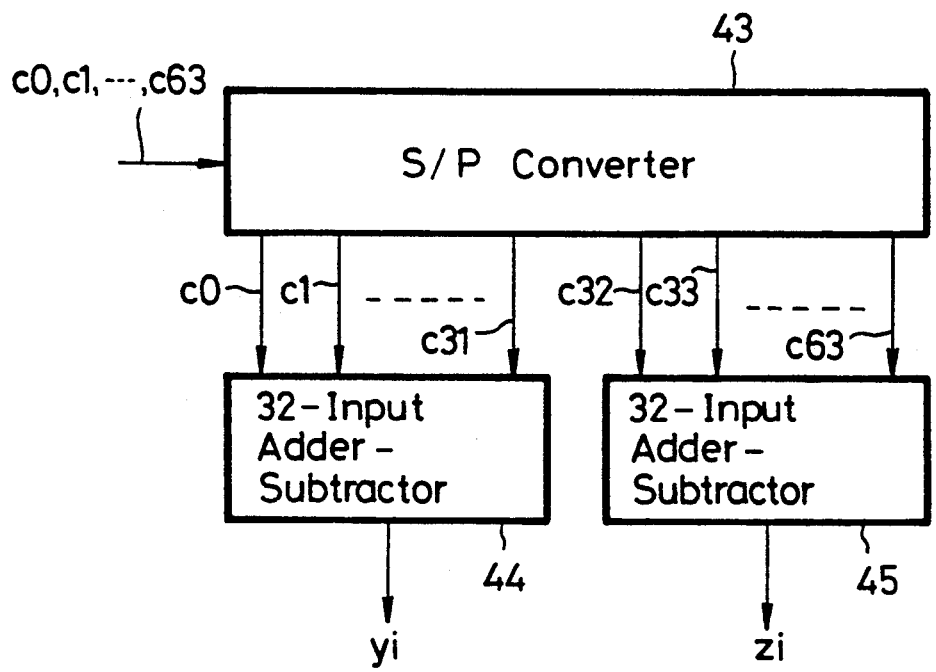
FIG. 9 is a block diagram of a $<y>$, $<z>$ calculating block in the IDCT processing circuit shown in FIG. 8.

FIG. 9 shows the $<y>$, $<z>$ calculating block 39 in specific detail. The $<y>$, $<z>$ calculating block 39 includes a one-input, 64-output serial-to-parallel (S/P) converter 43. The S/P converter 43 is serially supplied with the 64 elements ci in synchronism with 64 clock pulses, and then outputs data c0~c63, which are a parallel arrangement of the elements ci, to its 64 data output units in the period of next 64 clock pulses. The $<y>$, $<z>$ calculating block 39 also includes 32-input adder-subtractors 44, 45 (each equivalent to the circuit shown in FIG. 7 with n=35). The adder-subtractor 44 is supplied with the first 32 parallel data c0~c31 of the 64 data from the S/P converter 43, and the adder-subtractor 45 is supplied with the last 32 parallel data c32~c63 of the 64 data from the S/P converter 43. Based on the relationship between the equations (9) and (25), the elements of the vector $<y>$ are determined from the elements of the vector $<c>$ according to the following equation:

$$\begin{bmatrix} y0 \\ y1 \\ y2 \\ . \\ . \\ . \\ y63 \end{bmatrix} = [P1^t 0] \begin{bmatrix} c0 \\ c1 \\ c2 \\ . \\ . \\ . \\ c63 \end{bmatrix} = \begin{bmatrix} q0,0' & \ldots & \ldots & q0,31' \\ q1,0' & \ldots & \ldots & q1,31' \\ . & & & . \\ . & & & . \\ . & & & . \\ q63,0' & \ldots & \ldots & q63,31' \end{bmatrix} \begin{bmatrix} c0 \\ c1 \\ c2 \\ . \\ . \\ . \\ c31 \end{bmatrix} \qquad (26)$$

In the equation (26), P1' indicates a matrix which is transposed from the upper matrix of 32 rows and 64 columns in the equation (9). Since the elements qi,j' (j=0, 1, ..., 31) of the matrix P1' are 0, 1, or −1, the elements of the vector $<y>$ can be determined by adding and subtracting the first 32 elements c0~c31 of the vector $<c>$. Therefore, the adder-subtractor 44 shown in FIG. 9 serially calculates and outputs the 64 elements y0~y63 of the vector $<y>$ by performing additions and subtractions corresponding to the matrix P1'.

Likewise, based on the relationship between the equations (11) and (25), the elements of the vector $<z>$ are determined from the elements of the vector $<c>$ according to the following equation:

$$\begin{bmatrix} z0 \\ z1 \\ z2 \\ \cdot \\ \cdot \\ \cdot \\ z63 \end{bmatrix} = [0R1'] \begin{bmatrix} c0 \\ c1 \\ c2 \\ \cdot \\ \cdot \\ \cdot \\ c63 \end{bmatrix} = \tag{27}$$

$$\begin{bmatrix} q0,32' & \cdots & \cdots & q0,63' \\ q1,32' & \cdots & \cdots & q0,63' \\ \cdot & & & \cdot \\ \cdot & & & \cdot \\ \cdot & & & \cdot \\ q63,32' & \cdots & \cdots & q63,63' \end{bmatrix} \begin{bmatrix} c32 \\ c33 \\ c34 \\ \cdot \\ \cdot \\ \cdot \\ c63 \end{bmatrix}.$$

In the equation (27), $R1'$ indicates a matrix which is transposed from the lower matrix of 32 rows and 64 columns in the equation (11). Since the elements $qi,j'$ ($j=32, 33, \ldots, 63$) of the matrix $R1'$ are 0, 1, or $-1$, the elements of the vector $<y>$ can be determined by adding and subtracting the last 32 elements $c32 \sim c63$ of the vector $<c>$. Therefore, the adder-subtractor 45 shown in FIG. 9 serially calculates and outputs the 64 elements $z0 \sim z63$ of the vector $<z>$ by performing additions and subtractions corresponding to the matrix $R1'$.

Figure 10:
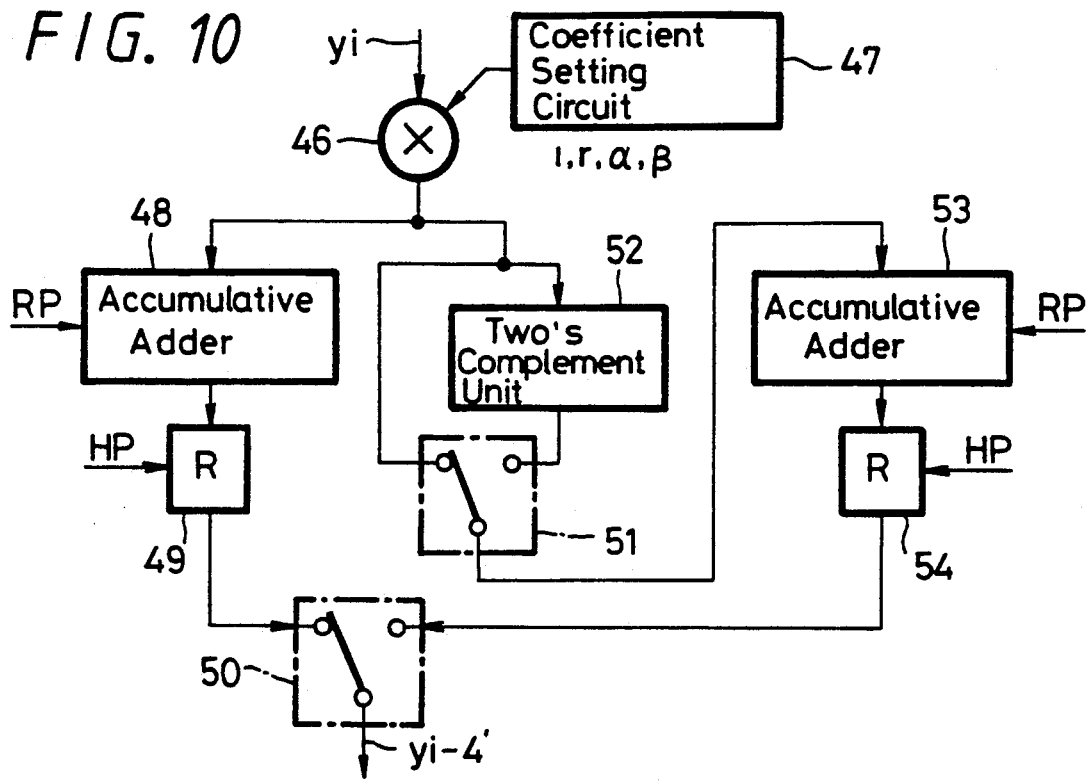
FIG. 10 is a block diagram of a $<y'>$ calculating block in the IDCT processing circuit shown in FIG. 8.

FIG. 10 shows the $<y'>$ calculating block 40 in specific detail. In FIG. 10, the elements yi of the vector $<y>$ that are serially supplied are supplied to a multiplier 46, which multiplies the supplied elements yi by coefficients 1, r, $\alpha$, $\beta$ that are periodically supplied from a coefficient setting unit 47. The multiplier 46 then supplies output product data through an accumulative adder 48 and a register 49 with a hold function to one input terminal of a data selector 50. The output product data is also supplied directly and through a two's complement unit 52 to respective input terminals of a data selector 51. The data selector 51 supplies selected output data through an accumulative adder 53 and a register 54 with a hold function to the other input terminal of the data selector 50. The data selector 50 then outputs the elements yi-4' of the vector $<y'>$ with a delay of four clock pulses with respect to the elements of the inputted vector $<y>$.

Operation of the $<y'>$ calculating block 40 shown in FIG. 10 will be described below. The vector $<y'>$ and the vector $<y>$ are related to each other as follows:

$$\begin{bmatrix} y0' \\ y1' \\ y2' \\ \cdot \\ \cdot \\ \cdot \\ y63' \end{bmatrix} = \begin{bmatrix} Q1' & & & 0 \\ & Q1' & & \\ & & \cdot & \\ & & & \cdot \\ 0 & & & Q1' \end{bmatrix} \begin{bmatrix} y0 \\ y1 \\ y2 \\ \cdot \\ \cdot \\ \cdot \\ y63 \end{bmatrix}, \tag{28}$$

$$Q1' = \begin{bmatrix} 1 & r & \alpha & \beta \\ 1 & r & \alpha & \beta \\ 1 & r & -\alpha & -\beta \\ 1 & r & -\alpha & -\beta \end{bmatrix}.$$

The matrix according to the equation (28) contains elements which are all 0 other than 16 smaller matrices $Q1'$ each of 4 rows and 4 columns along a diagonal line inclined downwardly to the right. Consequently, the equation (28) can be expressed in its entirety by the following equation (29):

$$\begin{bmatrix} y4j' \\ y4j+1' \\ y4j+2' \\ y4j+3' \end{bmatrix} = \begin{bmatrix} 1 & r & \alpha & \beta \\ 1 & r & \alpha & \beta \\ 1 & r & -\alpha & -\beta \\ 1 & r & -\alpha & -\beta \end{bmatrix} \begin{bmatrix} y4j \\ y4j+1 \\ y4j+2 \\ y4j+3 \end{bmatrix} \tag{29}$$

$$= \underbrace{\begin{bmatrix} 1 & 0 \\ 1 & 0 \\ 0 & 1 \\ 0 & 1 \end{bmatrix}}_{Q5} \underbrace{\begin{bmatrix} 1 & 1 & 1 & 1 \\ 1 & 1 & -1 & -1 \end{bmatrix}}_{Q6} \underbrace{\begin{bmatrix} 1 & 0 & 0 & 0 \\ 0 & r & 0 & 0 \\ 0 & 0 & \alpha & 0 \\ 0 & 0 & 0 & \beta \end{bmatrix}}_{Q7} \begin{bmatrix} y4j \\ y4j+1 \\ y4j+2 \\ y4j+3 \end{bmatrix}.$$

In the equation (29), $j=0, 1, 2, \ldots, 15$, and the four elements $y4j' \sim y4j+3'$ of the vector $<y'>$ can be determined by multiplication the vector composed of the four elements $y4j \sim y4j+3$ of the vector $<y>$ successively by the matrices Q7, Q6, and Q5. In the circuit shown in FIG. 10, as with the circuit shown in FIG. 4, the added values in the accumulative adders 48, 53 are reset to 0 by a reset pulse RP that is turned on initially in the period of four clock pulses, and are held in the respective registers 49, 54 by a hold pulse HP that is turned on finally in the period of four clock pulses. The registers 49, 54 always output the held data during the period of following four clock pulses. The data selector 51 selects the data outputted from the multiplier 46 in the period of first two of the four clock pulses, and selects the data outputted from the two's complement unit 52 in the period of next two clock pulses. The data selector 50 selects the data outputted from the register 49 in the period of first two of the four clock pulses, and selects the data outputted from the register 54 in the period of next two clock pulses.

In the circuit shown in FIG. 10, therefore, the matrix Q7 according to the equation (29) is calculated by the multiplier 46, the matrix Q6 by the accumulative adders 48, 53, the data selector 51, and the two's complement unit 52, and the matrix Q5 by the data selector 50.

Figure 11:
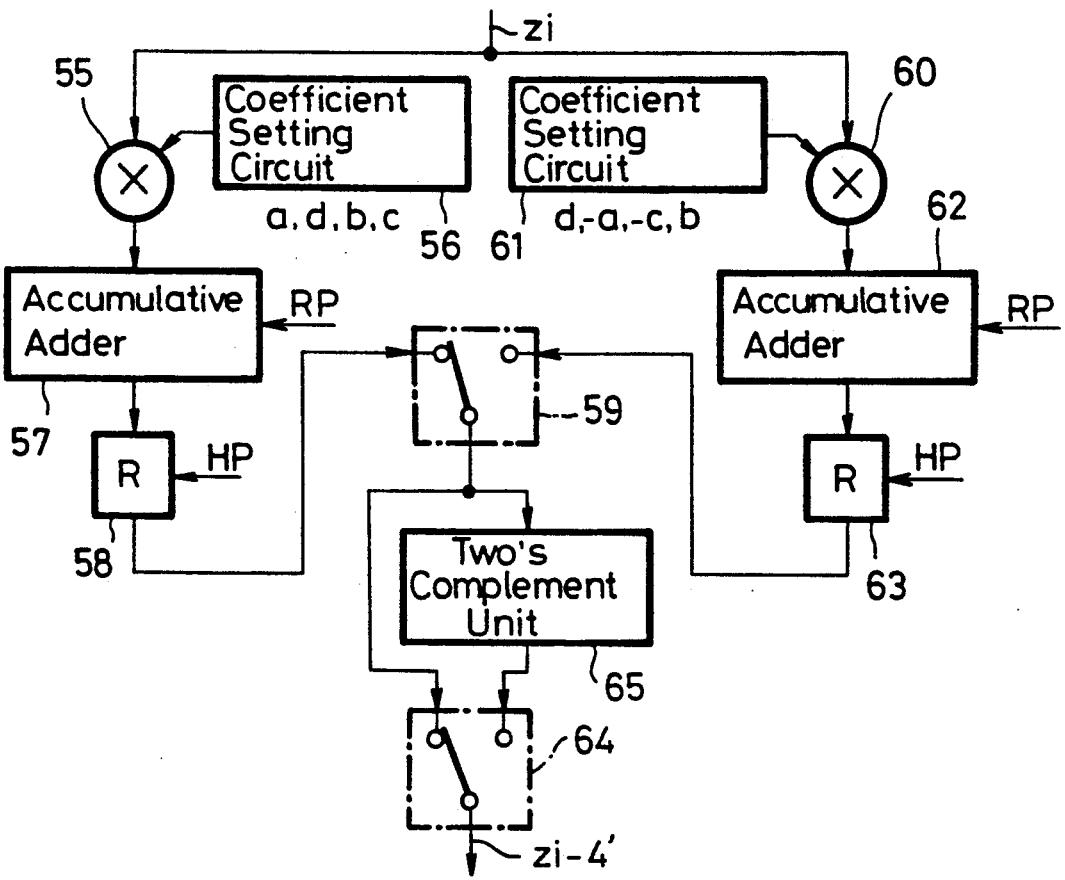
FIG. 11 is a block diagram of a $<z'>$ calculating block in the IDCT processing circuit shown in FIG. 8.

FIG. 11 shows the $<z'>$ calculating block 41 in specific detail. In FIG. 11, the elements zi of the vector $<z>$ that are serially supplied are supplied to a multiplier 55, which multiplies the supplied elements zi by coefficients a, d, b, c that are periodically supplied from a coefficient setting unit 56. The multiplier 55 then supplies output product data through an accumulative adder 57 and a register 58 with a hold function to one input terminal of a data selector 59. The elements zi of the vector $<z>$ are also supplied to a multiplier 60, which multiplies the supplied elements zi by coefficients d, $-a$, $-c$, b that are periodically supplied from a coefficient setting unit 61. The multiplier 60 then supplies output product data through an accumulative adder 62 and a register 63 with a hold function to the other input terminal of the data selector 59. The data selector 59 supplies selected output data directly and through a two's complement 65 to respective input terminals of a data selector 64. The data selector 64 then serially outputs the elements zi$-4'$ of the vector $<z'>$ with a delay of four clock pulses with respect to the elements of the inputted vector $<z>$.

Operation of the $<y'>$ calculating block 40 shown in FIG. 11 will be described below. According to the equations (12) and (25), the vector $<z'>$ can be determined by multiplying the vector $<z>$ and a matrix as follows:

$$\begin{bmatrix} z0' \\ z1' \\ z2' \\ \vdots \\ \vdots \\ \vdots \\ z63' \end{bmatrix} = \begin{bmatrix} S1' & & 0 \\ & S1' & \\ & & \ddots \\ 0 & & S1' \end{bmatrix} \begin{bmatrix} z0 \\ z1 \\ z2 \\ \vdots \\ \vdots \\ \vdots \\ z63 \end{bmatrix}, \quad (30)$$

$$S1' = \begin{bmatrix} a & d & b & c \\ -a & -d & -b & -c \\ d & -a & -c & b \\ -d & a & c & -b \end{bmatrix}.$$

The matrix of 64 rows and 64 columns according to the equation (30) contains elements which are all 0 other than 16 smaller matrices $S1'$ each of 4 rows and 4 columns along a diagonal line inclined downwardly to the right. Consequently, the equation (30) can be represented by the following equation (31):

$$\begin{bmatrix} z4j' \\ z4j+1' \\ z4j+2' \\ z4j+3' \end{bmatrix} = \begin{bmatrix} a & d & b & c \\ -a & -d & -b & -c \\ d & -a & -c & b \\ -d & a & c & -b \end{bmatrix} \begin{bmatrix} z4j \\ z4j+1 \\ z4j+2 \\ z4j+3 \end{bmatrix} \quad (31)$$

$$= \underbrace{\begin{bmatrix} 1 & 0 \\ -1 & 0 \\ 0 & 1 \\ 0 & -1 \end{bmatrix}}_{S4} \underbrace{\begin{bmatrix} a & d & b & c \\ d & -a & -c & b \end{bmatrix}}_{S5} \begin{bmatrix} z4j \\ z4j+1 \\ z4j+2 \\ z4j+3 \end{bmatrix}.$$

In the equation (31), j=0, 1, 2, ..., 15, and the four elements z4j'$\sim$z4j+3' of the vector $<z'>$ can be determined by multiplying the vector composed of the four elements z4j$\sim$z4j+3 of the vector $<z>$ successively by the matrices S5 and S4.

In the circuit shown in FIG. 11, as with the circuit shown in FIG. 10, the added values in the accumulative adders 57, 62 are reset to 0 by a reset pulse RP that is turned on initially in the period of four clock pulses, and are held in the respective registers 58, 63 by a hold pulse HP that is turned on finally in the period of four clock pulses. The registers 58, 63 always output the held data during the period of following four clock pulses. The data selector 59 selects the data outputted from the register 58 in the period of first two of the four clock pulses, and selects the data outputted from the register 63 in the period of next two clock pulses. The data selector 64 alternately selects the data outputted from the data selector 59 and the data outputted from the two's complement unit 65.

In the circuit shown in FIG. 11, therefore, the matrix S5 according to the equation (31) is calculated by the multipliers 55, 60, and the matrix S4 by the data selectors 59, 64 and the two's complement unit 65.

Another embodiment of the present invention will be described below with reference to FIGS. 12 and 13. According to this embodiment, the $<y>$, $<z>$ calculating block 39 in the circuit shown in FIG. 8 for IDCT calculations is implemented by a smaller-scale circuit arrangement. The vectors $<y>$ and $<z>$ defined according to the equation (25) are expressed as follows:

$$<y> = P'<c> = PT<c>,$$

$$<z> = R'<c> = R'T<c> \quad (32)$$

where P', R', and T are respectively constant matrices of 64 rows and 64 columns as defined as follows:

$$T = \begin{bmatrix} T1 & & & 0 \\ & T1 & & \\ & & T1 & \\ & & & \ddots \\ 0 & & & T1 \end{bmatrix}, \quad T1 = \begin{bmatrix} 1 & 1 \\ 1 & -1 \end{bmatrix}. \quad (33)$$

The matrix T contains elements which are all 0 other than 16 smaller matrices T1 each of 4 rows and 4 columns along a diagonal line inclined downwardly to the right. The elements of the smaller matrices T1 are 1 and $-1$.

$$P = \begin{bmatrix} \cdots \end{bmatrix}$$

The matrix P' according to the above equation (34) includes 64 rows and 32 columns in the lefthand half whose elements are 0, 1, or −1, and 32 rows and 64 columns in the righthand half whose elements are all 0.

$$R' = \begin{bmatrix} \cdots \end{bmatrix}$$

The matrix R' according to the above equation (35) includes 64 rows and 32 columns in the righthand half whose elements are 0, 1, or −1, and 32 rows and 64 columns in the lefthand half whose elements are all 0.

If it is assumed that a vector T $<c>$ is expressed as a vector $<c'>$ and the vector $<c'>$ has 64 elements c0'~c63', then the following relationship can be derived from the equation (33):

$$\begin{bmatrix} c0' \\ c1' \\ c2' \\ \vdots \\ c63' \end{bmatrix} = \begin{bmatrix} T1 & & & 0 \\ & T1 & & \\ & & \ddots & \\ 0 & & & T1 \end{bmatrix} \begin{bmatrix} c0 \\ c1 \\ c2 \\ \vdots \\ cz63 \end{bmatrix} \quad (36)$$

Because of the characteristics of the smaller matrices T1, the equation (36) can be represented by the following equation (37):

$$\begin{bmatrix} c2j' \\ c2j+1' \end{bmatrix} = \begin{bmatrix} 1 & 1 \\ 1 & -1 \end{bmatrix} \begin{bmatrix} c2j \\ c2j+1 \end{bmatrix}. \tag{37}$$

In the equation (37), $j=0, 1, \ldots, 31$, and the two elements of the vector $<c'>$ can be determined by adding and subtracting the two elements of the vector $<c>$. Using the vector $<c'>$, the vectors $<y>$ and $<z>$ according to the equations (32) can be calculated as follows:

$$<y> = \begin{bmatrix} y0 \\ y1 \\ y2 \\ \cdot \\ \cdot \\ \cdot \\ y63 \end{bmatrix} = [P1'] \begin{bmatrix} c0' \\ c1' \\ \cdot \\ \cdot \\ \cdot \\ c31' \end{bmatrix}, \tag{38}$$

$$<z> = \begin{bmatrix} z0 \\ z1 \\ z2 \\ \cdot \\ \cdot \\ \cdot \\ z63 \end{bmatrix} = [R1'] \begin{bmatrix} c32' \\ c33' \\ \cdot \\ \cdot \\ \cdot \\ c63' \end{bmatrix}.$$

In the equations (38), the matrix P1' is the same as the matrix in the lefthand half of the equation (34), and the matrix R1' is the same as the matrix in the righthand half of the equation (35). According to the equations (38), the vector $<y>$ can be determined simply by adding and subtracting the first 32 elements $c0' \sim c31'$ of the vector $<c'>$, and the vector $<c>$ can be determined simply by adding and subtracting the succeeding 32 elements $c32' \sim c63'$ of the vector $<c'>$. Another $<y>$, $<z>$ calculating block for calculating the equations (36) and (38) is shown in FIG. 12.

Figure 12:
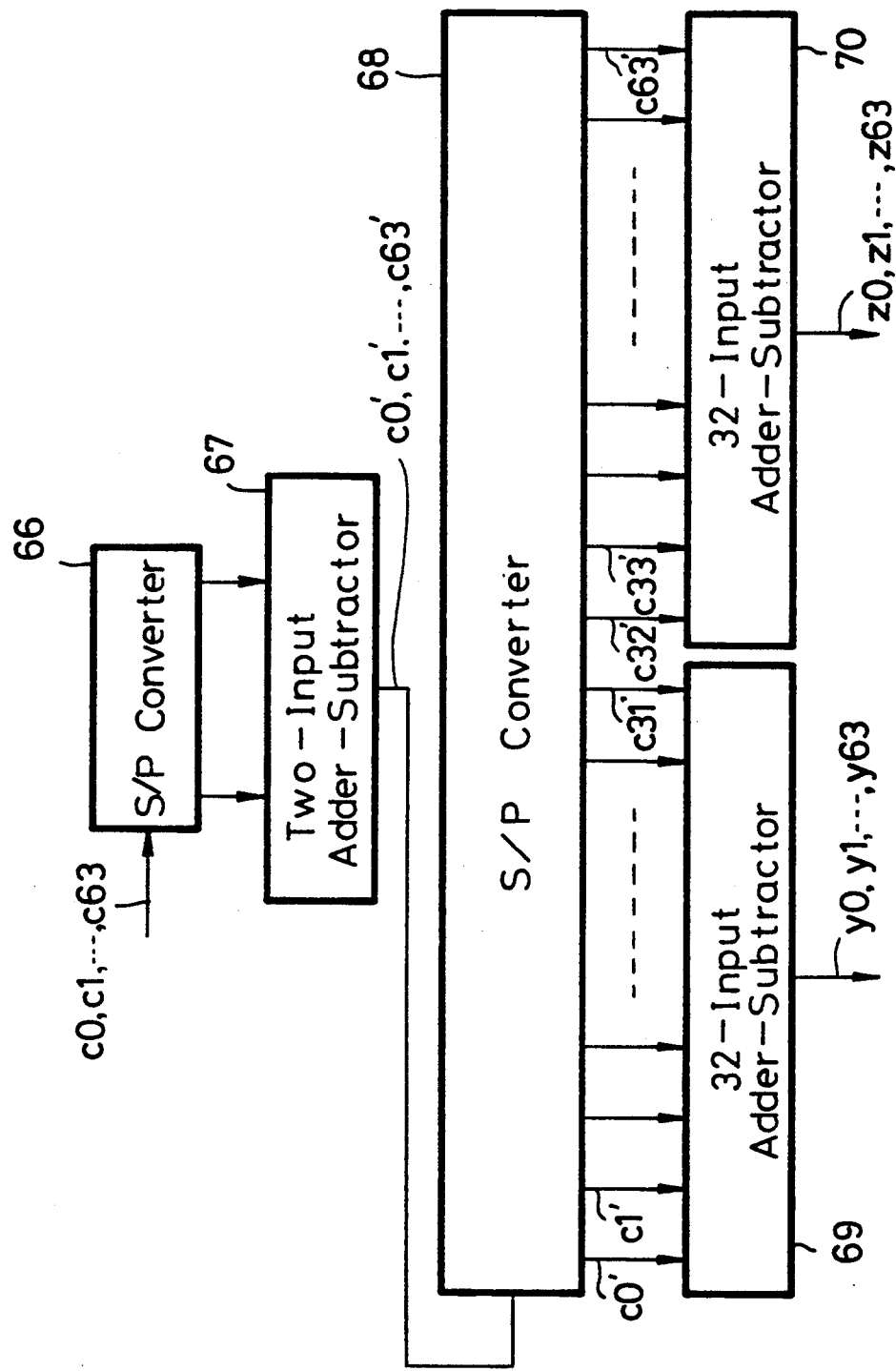
FIG. 12 is a block diagram of a $<y>$, $<z>$ calculating block in a two-dimensional 8×8 IDCT processing circuit according to another embodiment of the present invention.

As shown in FIG. 12, the $<y>$, $<z>$ calculating block includes a one-input, two-output S/P converter 66, a two-input, one-output adder-subtractor 67 (equivalent to the circuit shown in FIG. 7 with n=2) for calculating the equation (37), and a one-input, 64-output S/P converter 68. The 64 serial elements $c0 \sim c63$ of the vector $<c>$ are converted into the 64 serial elements $c0' \sim c63'$ of the vector $<c'>$ by the S/P converter 66 and the adder-subtractor 67. These elements $c0' \sim c63'$ are serially supplied to an input terminal of the S/P converter 68. The S/P converter 68 has 64 output terminals which output the elements $c0' \sim c63'$ parallel to each other. The first 32 elements $c0' \sim c31'$ of the outputted parallel data are supplied to a lefthand 32-input, one-output adder-subtractor 69, and the succeeding 32 elements $c32' \sim c63'$ are supplied to a righthand 32-input, one-output adder-subtractor 70. The lefthand adder-subtractor 69 calculates the matrix P1' according to the equations (38), and serially outputs the elements yi of the vector $<y>$, and the righthand adder-subtractor 70 calculates the matrix R1' according to the equations (38), and serially outputs the elements zi of the vector $<z>$.

Figure 13:
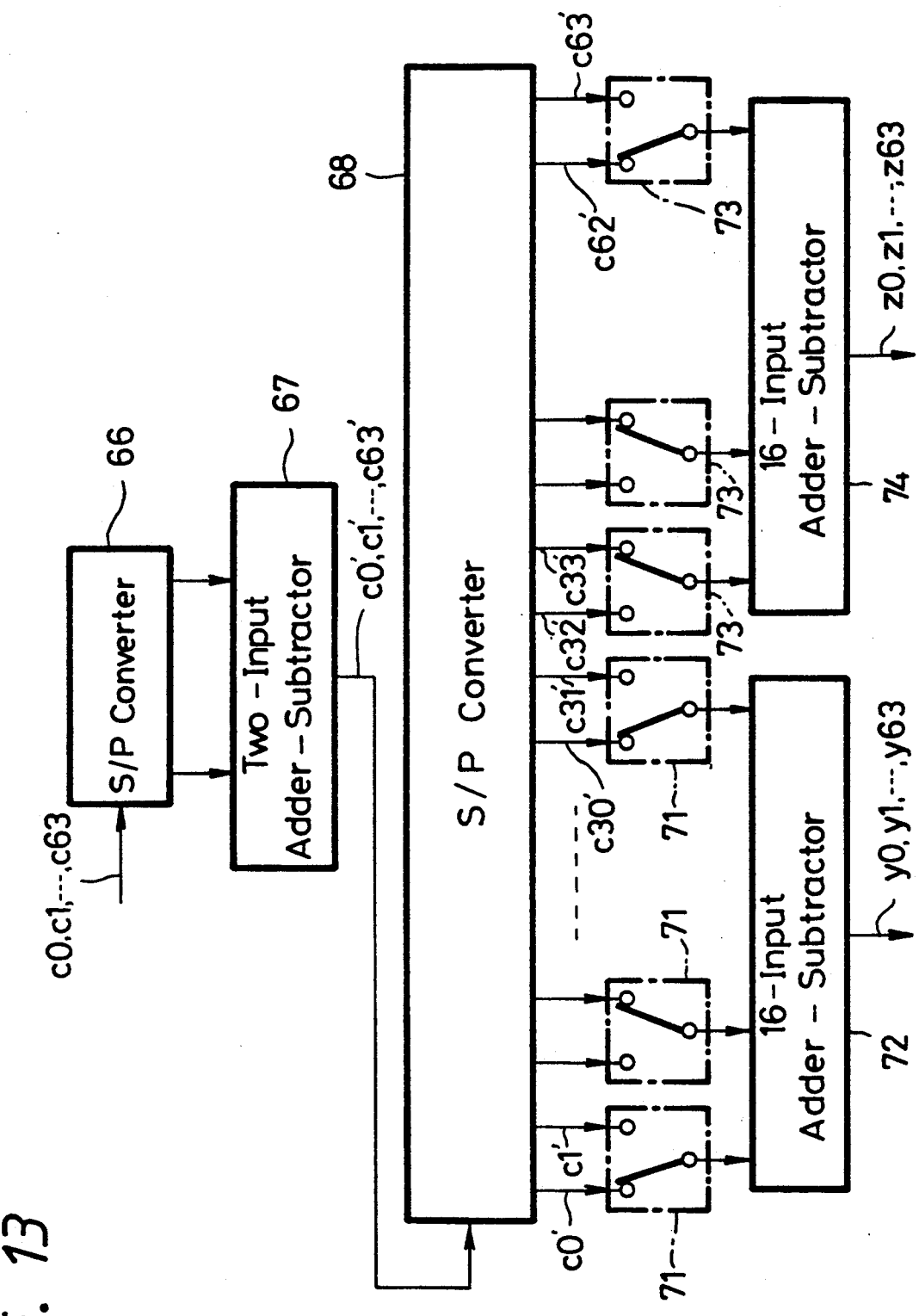
FIG. 13 is a block diagram of a modification of the $<y>$, $<z>$ calculating block shown in FIG. 12.

The $<y>$, $<z>$ calculating block shown in FIG. 12 may be modified as shown in FIG. 13. In FIG. 13, the $<y>$, $<z>$ calculating block includes 16 two-input, one-output data selectors 71 having input terminals supplied with the first 32 elements $c0' \sim c31'$ outputted parallel from the S/P converter 68. The data selectors 71 supply output data to the input terminals of a lefthand 16-input, one-output adder-subtractor 72 (equivalent to the circuit shown in FIG. 5 with n=16). The $<y>$, $<z>$ calculating block also includes 16 two-input, one-output data selectors 73 having input terminals supplied with the succeeding 32 elements $c32' \sim c63'$ outputted parallel from the S/P converter 68. The data selectors 73 supply output data to the input terminals of a righthand 16-input, one-output adder-subtractor 74.

The adder-subtractor 72 is supplied with only the data representing half of the 32 elements $c0' \sim c31'$ from the data selectors 71. As can be seen from the equation (34), at least one of two adjacent elements in each row of the matrix P1' according to the equation (38) is 0 at all times. Therefore, inasmuch as the elements ci' that are virtually employed in the calculations relative to the matrix P1' according to the equations (38) are less than half the supplied elements, the calculations relative to the matrix P1' can be carried out by the 16-input adder-subtractor 72. Likewise, at least one of two adjacent elements in each row of the matrix R1' according to the equation (38) is 0 at all times as can be seen from the equation (35). Consequently, the righthand 16-input adder-subtractor 74 can effect the calculations relative to the matrix R1'.

With the present invention, a matrix of N rows and N columns in a real space and a matrix of N rows and N columns in a space of spatial frequencies are converted respectively into vectors each having $N^2$ elements, and the vectors are processed for DCT or IDCT. Accordingly, desired data can be processed for two-dimensional DCT or IDCT with a reduced number of multipliers.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. An image data processing apparatus for performing a discrete cosine transform by which input image data arranged in a matrix of $N^2$ input data elements consisting of N rows and N columns (N being an integer of 2 or greater) are transformed into $N^2$ transformed image data elements, said image data processing apparatus comprising:

a first calculating circuit including a memory element, and which serially receives a sequence of said $N^2$ input data elements for calculating therefrom a sequence of $N^2$ first vector data elements and serially outputting said sequence of first vector data elements;

a second vector calculating circuit serially receiving said sequence of said $N^2$ input data elements for calculating therefrom a sequence of $N^2$ second vector data elements and serially outputting said sequence of second vector data elements; and means, having a first input terminal that serially receives said sequence of first vector data elements and a second input terminal that serially receives said sequence of second vector data elements, for adding and subtracting data elements of said sequences of vector data elements to serially produce therefrom said $N^2$ transformed image data elements, and for serially outputting said $N^2$ transformed image data elements.

2. An apparatus according to claim 1, in which:

said first calculating circuit comprises a first multiplier for sequentially multiplying selected accumulations of said input data elements by selected coefficients to produce said first vector data elements;

said second calculating circuit comprises a second multiplier for sequentially multiplying differences obtained from first pairs of said input data elements by selected coefficients to produce a sequence of first products, a third multiplier for sequentially multiplying differences obtained from second pairs of said input data elements by selected coefficients to produce a sequence of second products, and an adder for summing respective products of said sequences of first and second products; and said first, second and third multipliers are the only multipliers in said apparatus.

3. An image data processing apparatus for performing an inverse discrete cosine transform by which a sequence of $N^2$ input image data elements (N being an integer of 2 or greater) are transformed into $N^2$ inverse transformed data elements, said image processing apparatus comprising:

a first calculating circuit serially receiving said sequence of input image data elements for adding and subtracting elements of said sequence to produce therefrom a sequence of $N^2$ first vector data elements and a sequence of $N^2$ second vector data elements, and for serially outputting said first and second vector data elements;

a second calculating circuit including a memory element, and which serially receives said sequence of first vector data elements for calculating therefrom a sequence of $N^2$ third vector data elements and serially outputting said sequence of third vector data elements;

a third calculating circuit serially receiving said sequence of second vector data elements for calculating therefrom a sequence of $N^2$ fourth vector data elements and serially outputting said sequence of fourth vector data elements; and an adder for receiving and adding corresponding respective elements of said sequences of third and fourth vector data elements to produce said $N^2$ inverse transformed data elements.

4. An apparatus according to claim 2, in which:

said second calculating circuit comprises a first multiplier for sequentially multiplying said first vector data elements by selected coefficients;

said third calculating circuit comprises second and third multipliers for sequentially multiplying said second vector data elements by respective selected coefficients; and said first, second and third multipliers are the only multipliers in said apparatus.

5. A discrete cosine transform apparatus for serially receiving a sequence of 64 input data elements corresponding to an $8 \times 8$ matrix of image data and serially outputting a sequence of 64 transformed data elements corresponding to an $8 \times 8$ matrix of transformed image data, the apparatus comprising:

a first accumulation-multiplication (AM) circuit that includes a first accumulative adder for summing four of said sequence of input data elements to form a first accumulation, a second accumulative adder for summing a first pair of said four data elements to form a sum and subtracting therefrom each of a second pair of said four data elements to form a second accumulation, respective memory elements that hold said first and second accumulations, and a first multiplier for multiplying a selected one of said first and second accumulations by a selected coefficient to form a first vector data element;

a second accumulation-multiplication (AM) circuit that includes a third accumulative adder for forming a first difference of said first pair of said four data elements, a second multiplier for multiplying said first difference by a selected coefficient to form a first product, a fourth accumulative adder for forming a second difference of said second pair of said four data elements, a third multiplier for multiplying said second difference by a selected coefficient to form a second product, and an adder for summing said first and second products to form a second vector data element; and means connected to said first and second AM circuits for sequentially receiving and storing 64 first vector data elements formed by said first AM circuit from said 64 input data elements and 64 second vector data elements formed by said second AM circuit from said 64 input data elements, and for adding and subtracting selected ones of said stored vector data elements to form said 64 transformed data elements.

6. An apparatus according to claim 5 in which said first, second and third multipliers are the only multipliers in said apparatus.

7. An inverse discrete cosine transform apparatus for serially receiving a sequence of 64 input data elements corresponding to an $8 \times 8$ matrix of transformed image data and serially outputting a sequence of 64 output data elements corresponding to an $8 \times 8$ matrix of inverse transformed image data, the apparatus comprising:

means for sequentially receiving and storing said 64 input data elements, for adding and subtracting selected ones of said stored input data elements to form 64 first vector data elements, and for adding and subtracting other selected ones of said stored input data elements to form 64 second vector data elements;

a first multiplication-accumulation circuit that includes a first multiplier for multiplying ones of said first vector data elements by selected coefficients to form first products, a first accumulative adder for summing four of said first products to form a third vector data element, a first memory element that stores said third vector data element, a second accumulative adder for summing a first pair of said four products and subtracting therefrom each of a second pair of said four products to form another third vector data element, and a second memory element that stores said other third vector data element;

a second multiplication-accumulation circuit that includes a second multiplier for multiplying ones of said second vector data elements by selected coefficients to form second products, a third accumulative adder for summing four of said second products to form a fourth vector data element, a third multiplier for multiplying said ones of said second vector data elements by other selected coefficients to form third products, and a fourth accumulative adder for summing four of said third products to form another fourth vector data element; and an adder connected to said first and second multiplication-accumulation circuits for sequentially adding corresponding ones of said third and fourth vector data elements to form said 64 output data elements.

8. An apparatus according to claim 7, in which said first, second and third multipliers are the only multipliers in said apparatus.

* * * * *